US012764387B2

(12) United States Patent
Bates

(10) Patent No.: US 12,764,387 B2
(45) Date of Patent: Oct. 13, 2026

(54) CONTEXTUAL USER INTERFACE ELEMENT DETECTION

(71) Applicant: Sonos, Inc., Goleta, CA (US)

(72) Inventor: Paul Andrew Bates, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/869,704

(22) PCT Filed: May 16, 2023

(86) PCT No.: PCT/US2023/067075
§ 371 (c)(1),
(2) Date: Nov. 26, 2024

(87) PCT Pub. No.: WO2023/235659
PCT Pub. Date: Dec. 7, 2023

(65) Prior Publication Data
US 2025/0301201 A1 Sep. 25, 2025

Related U.S. Application Data

(60) Provisional application No. 63/365,571, filed on May 31, 2022.

(51) Int. Cl.
*H04N 21/472* (2011.01)
*G06F 3/0482* (2013.01)
*G06F 3/0488* (2022.01)

(52) U.S. Cl.
CPC ......... *H04N 21/472* (2013.01); *G06F 3/0482* (2013.01); *G06F 3/0488* (2013.01)

(58) Field of Classification Search
CPC ........... H04N 21/262; H04N 21/41265; H04N 21/42204; H04N 21/4312; H04N 21/472;
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 0153994 A2 7/2001
WO 03093950 A2 11/2003

OTHER PUBLICATIONS

AudioTron Quick Start Guide, Version 1.0, Mar. 2001, 24 pages.
(Continued)

*Primary Examiner* — Michael B. Pierorazio
(74) *Attorney, Agent, or Firm* — Fortem IP LLP

(57) ABSTRACT

A control device such as a mobile device can be used as a secondary display to provide a controller user interface (UI) element corresponding to a contextual display user interface element displayed via a television or other device. An example method includes receiving a media data stream from a media content provider and transmitting the media data stream to a display device for playback. After determining that the media data stream comprises a contextual display user interface element, the method involves causing the controller device to present a controller user interface element corresponding to the contextual display user interface element. An indication of a user input via the controller user interface element is received, after which a signal is transmitted to the media provider that corresponds to the received indication of user input.

20 Claims, 23 Drawing Sheets

(58) Field of Classification Search
CPC ............ H04N 21/485; H04N 21/25891; G06F 3/0482; G06F 3/0488
See application file for complete search history.

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollström et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 10,254,945 | B1 | 4/2019 | Gupta et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty | |
| 2004/0024478 | A1 | 2/2004 | Hans et al. | |
| 2005/0157900 | A1 | 7/2005 | Litovsky et al. | |
| 2007/0142944 | A1 | 6/2007 | Goldberg et al. | |
| 2007/0233839 | A1* | 10/2007 | Gaos | H04N 21/44224 348/E7.07 |
| 2007/0271580 | A1* | 11/2007 | Tischer | H04H 60/07 725/35 |
| 2012/0265621 | A1* | 10/2012 | Sechrist | H04N 21/25808 709/219 |
| 2012/0309515 | A1* | 12/2012 | Chung | H04N 21/4781 463/31 |
| 2014/0028920 | A1* | 1/2014 | Wang | H04N 21/42204 348/734 |
| 2014/0358012 | A1* | 12/2014 | Richards | H04W 4/027 600/479 |
| 2015/0347416 | A1* | 12/2015 | Lin | H04N 21/47214 707/751 |
| 2017/0064363 | A1* | 3/2017 | Wexler | H04L 67/306 |
| 2017/0085980 | A1 | 3/2017 | Chou | |
| 2019/0191218 | A1* | 6/2019 | Cormican | H04N 21/478 |
| 2020/0092608 | A1* | 3/2020 | Cruz Huertas | H04W 12/04 |
| 2020/0228859 | A1* | 7/2020 | Ho | A61B 5/165 |
| 2021/0185369 | A1* | 6/2021 | Watson | H04N 21/2401 |
| 2022/0417651 | A1 | 12/2022 | Backman | |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability, mailed on Dec. 12, 2024, issued in connection with International Application No. PCT/US2023/067075, filed on May 16, 2023, 8 pages.
International Searching Authority, International Search Report and Written Opinion mailed on Jul. 20, 2023, issued in connection with International Application No. PCT/US2023/067075, filed on May 16, 2023, 12 pages.
International Searching Authority, International Search Report and Written Opinion mailed on Dec. 5, 2024, issued in connection with International Application No. PCT/US2024/035436, filed on Jun. 25, 2024, 20 pages.
International Searching Authority, Invitation to Pay Additional Fees and Where Applicable, Protest Fee mailed on Oct. 14, 2024, issued in connection with International Application No. PCT/US2024/035436, filed on Jun. 25, 2024, 18 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

CONTEXTUAL USER INTERFACE ELEMENT DETECTION

CROSS-REFERENCE TO RELATED APPLICATION

This application is a 371 national phase application of International Patent Application No. PCT/US2023/067075, filed May 16, 2023, which claims the benefit of priority to U.S. Patent Application No. 63/365,571, filed May 31, 2022, each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
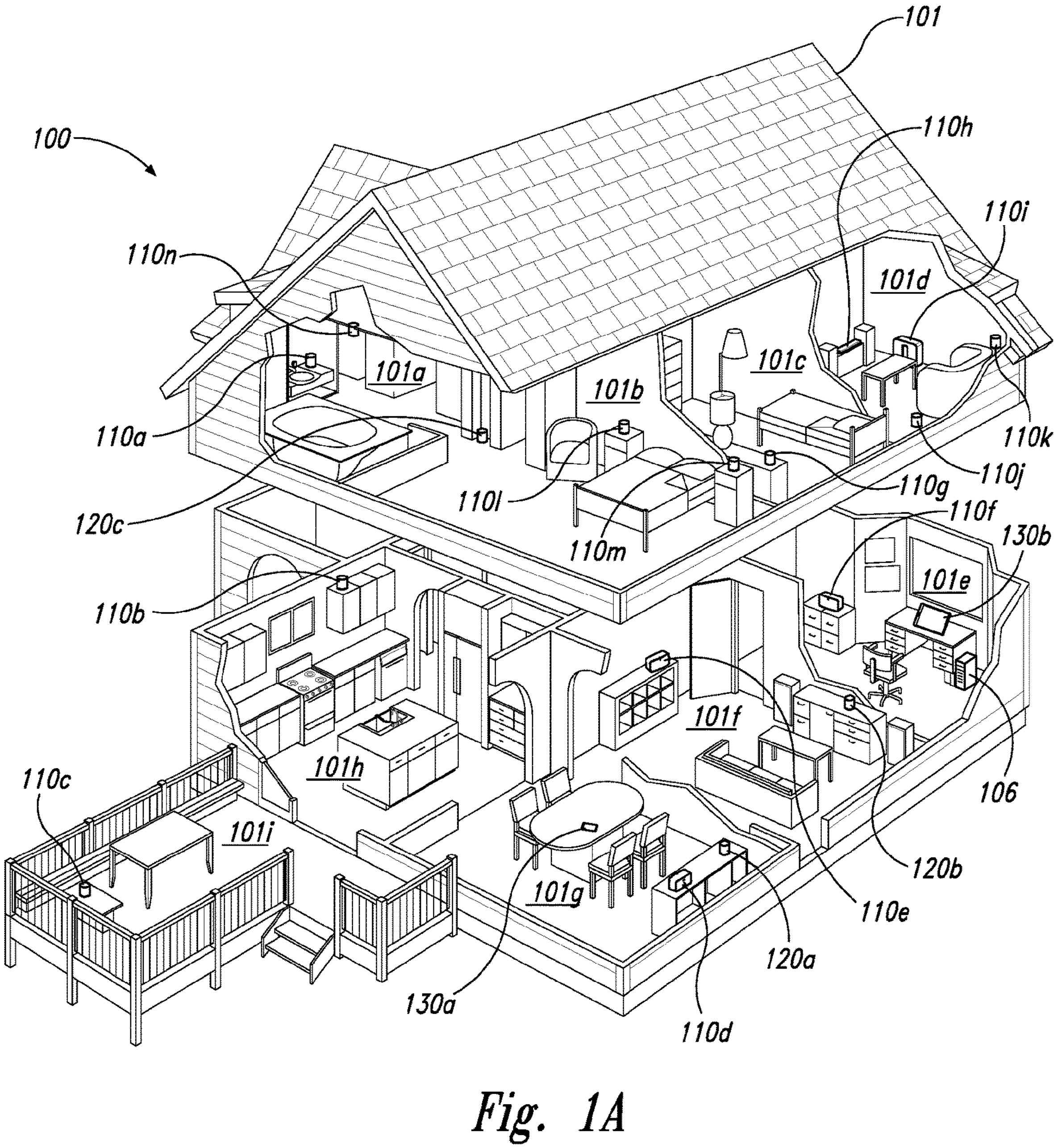
FIG. 1A shows a partial cutaway view of an environment having a media playback system configured in accordance with aspects of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional video playback devices, such as televisions and/or set-top boxes, often include graphical user interfaces (GUIs) through which a user can provide input to the video playback device, such as browsing content and controlling playback. Certain internet-connected video playback devices, such as "smart televisions," may additionally offer an associated software application ("app") that can run on a user's mobile control device (e.g., a smartphone or tablet). Such applications can facilitate user setup of the video playback device, as well as serve as a "virtual remote," permitting the user to provide commands to the video playback device using the application on the user's control device.

While using a smartphone as a virtual remote provides certain benefits over conventional remotes, the functionality offered via such virtual remotes remains sparse and poorly integrated with the user's experience via the primary display. In general, the secondary display of the user's control device is treated as an afterthought, and the content available via such displays is inadequate to justify the hassle of managing yet another remote. As described in more detail below, examples of the present technology enable a much richer user experience than conventional approaches by taking full advantage of the capabilities of the user's mobile control device (or other such secondary display device) while viewing content via a primary video playback device (such as a television). In some examples, a software application running on the user's mobile control device (such as a smartphone) can both control operation of the video playback device (such as a television) and provide controller user interface features and elements to the user that are relevant to the current context of a media data stream (e.g., when content is playing, paused, when menus and/or guides are being presented, etc.). This approach allows multiple different users to view the same content via a primary display device (e.g., a smart television) while interacting separately with contextual user interfaces provided via each of the user's mobile devices. By integrating the user's control device into operation of the video playback device(s) within the user's environment, a more powerful and seamless user experience can be achieved.

Many content providers, such as over-the-top (OTT) media content providers, provide user interfaces and features that users expect to use while interacting with content. For example, a content provider may present a contextual (e.g., temporary, ephemeral, etc.) display user interface that displays a "Skip Intro" button during an introduction or title sequence of media content, such as a television program. Another example is a user interface displaying a "Skip to Next" button, which may be accompanied by a countdown timer, which allows a user to skip to a subsequent piece of media content, such as the next episode of a television program, the next movie in a series of movies, the next song on an album, etc. Another example is a user interface displaying one or more text boxes and a virtual or on-screen keyboard for entering information, such as a user's name, password, email address, account information, etc. In another example, a user interface may allow text entry into a text field via a mobile device while the text field is the "focused" user interface element on another display device, such as a television. However, these display user interface elements are often non-standardized (e.g., via in code execution, proprietary application programming interfaces (APIs), etc.) and may be mixed with the underlying content itself. Moreover, content provider applications and internal functions generally do not provide API or channel functionality to other operating systems (OS) and/or remote controls (e.g., a Sonos video service and remote). Without knowledge of a content provider's user interface, however, an OS and/or remote control cannot provide controls or other affordances to interact with the content provider's user interface. Additionally, most content provider applications use custom keyboards and/or text entry and may be authored in several different ways, which can further hamper efforts to determine what is being presented to the user via the content provider's user interface. Accordingly, there is a desire to implement a contextually relevant user interface, such as a contextual controller user interface rendered via a mobile application, that suits the current context of a media data stream (e.g., when content is playing, paused, displaying menus, or playing nothing at all) and that allows a user to interact with or otherwise control playback of content, while minimizing extraneous user interface elements.

The disclosed playback devices, media playback systems, and/or methods can improve upon previous graphical user interfaces by dynamically providing a contextual controller user interface based on an underlying contextual display user interface. The disclosed media playback system monitors a contextual display user interface to ascertain a condition indicating that one or more contextual user interface elements are being displayed (or should be displayed). When such user interface elements are detected (or inferred), the media playback system causes a secondary device (e.g., a smartphone) to display a representative contextual controller user interface and corresponding user interface elements. When the contextual display user interface elements are removed, the media playback system can remove the corresponding contextual controller user interface elements from the display of the controller device. By permitting contextual user interface elements to be dynamically relocated to and concurrently displayed via, for example, a user's smartphone based upon a display or inference condition, the media playback system's ability to display relevant information and to interact with the user is improved.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles, and other features shown in the Figures are merely illustrative of particular examples of the disclosed technology. Accordingly, other examples can have other details, dimensions, angles, and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio data. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio data in synchrony as individual ones of playback devices 110, as a bonded playback zone, as a consolidated playback device, and/or any combination thereof. Similarly, in the den 101*d*, the playback devices 110*h-j* can be configured, for instance, to play back audio data in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio data. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio data in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio data is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
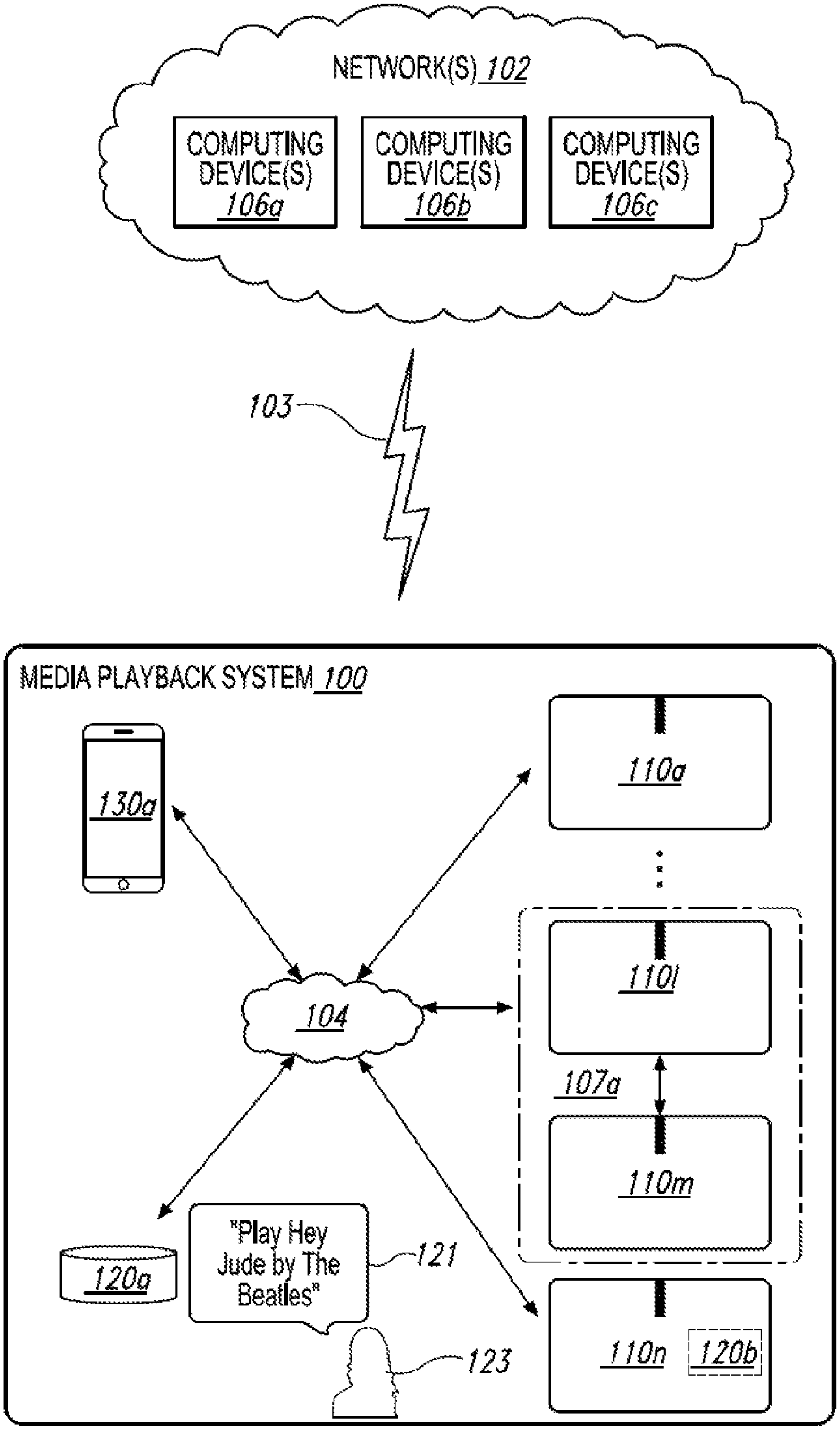
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio data, video data, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio data sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110 and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio data in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
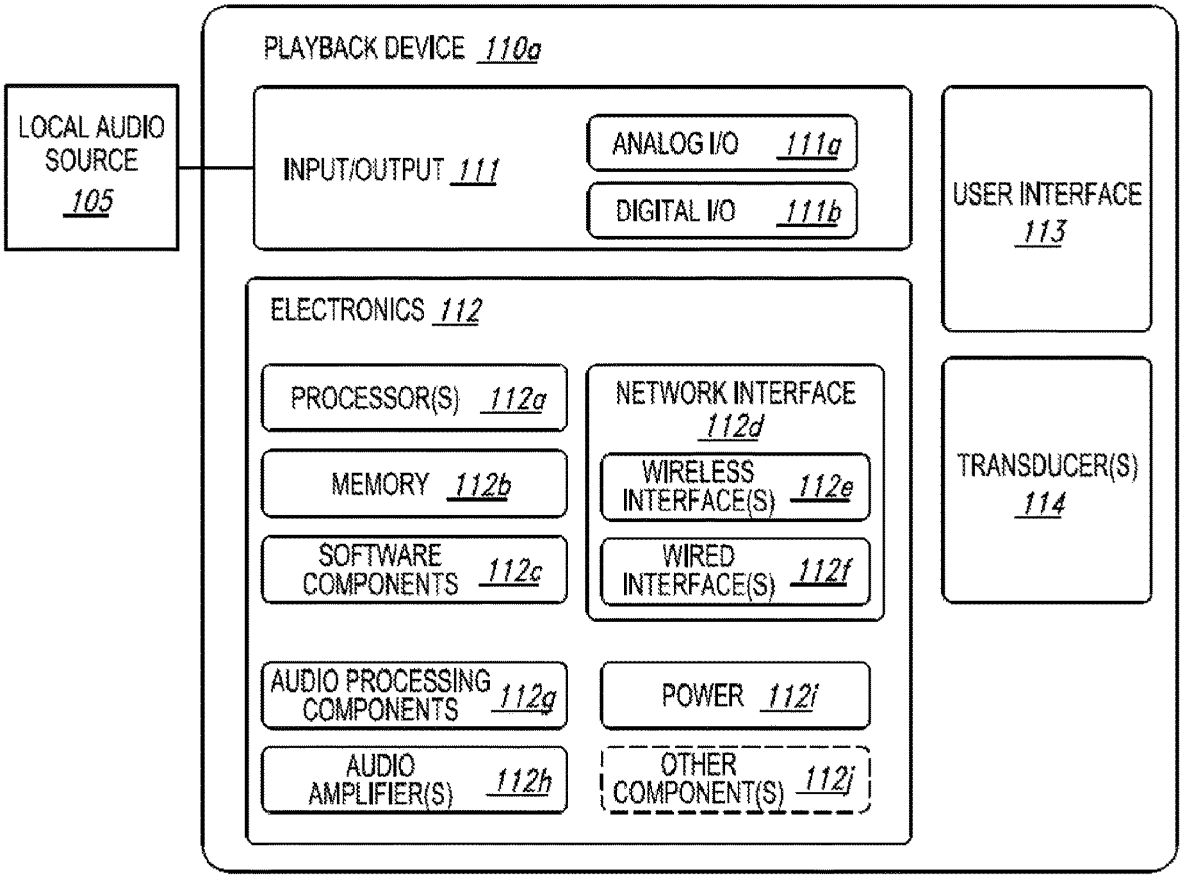
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth. or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio data comprising music and/or other sounds) from a local audio source 105 via the input/output Ill (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio data via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array)(hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio information from an audio source (e.g., one or more of the computing devices 106*a-c* (FIG. 1B)), and/or another one of the playback devices 110. In some embodiments, the operations further include causing the playback device 110*a* to send audio information to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio data with another of the one or more playback devices 110. As those of ordinary skill in the art will appreciate, during synchronous playback of audio data on a plurality of playback devices, a listener will preferably be unable to perceive time-delay differences between playback of the audio data by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio data, video data, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
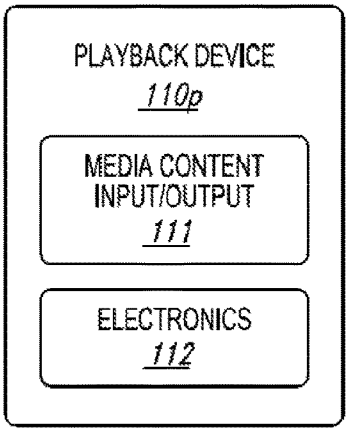
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
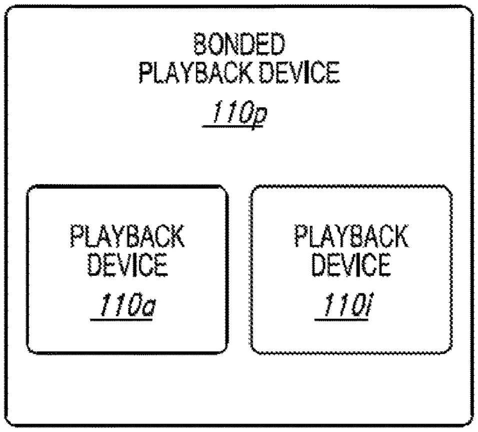
FIG. 1E shows a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figure 1F:
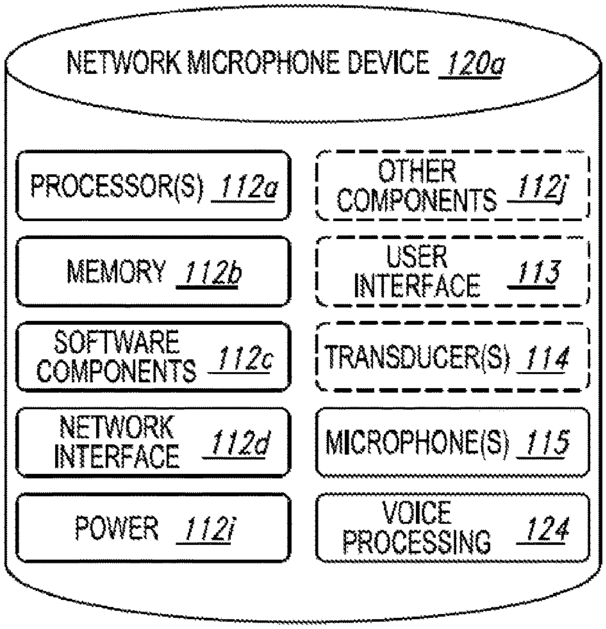
FIG. 1F shows a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
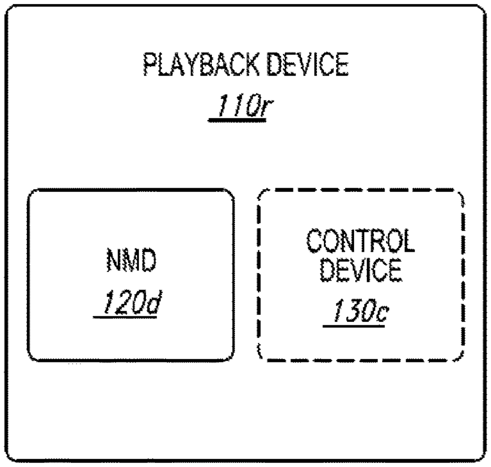
FIG. 1G shows a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

Figure 1H:
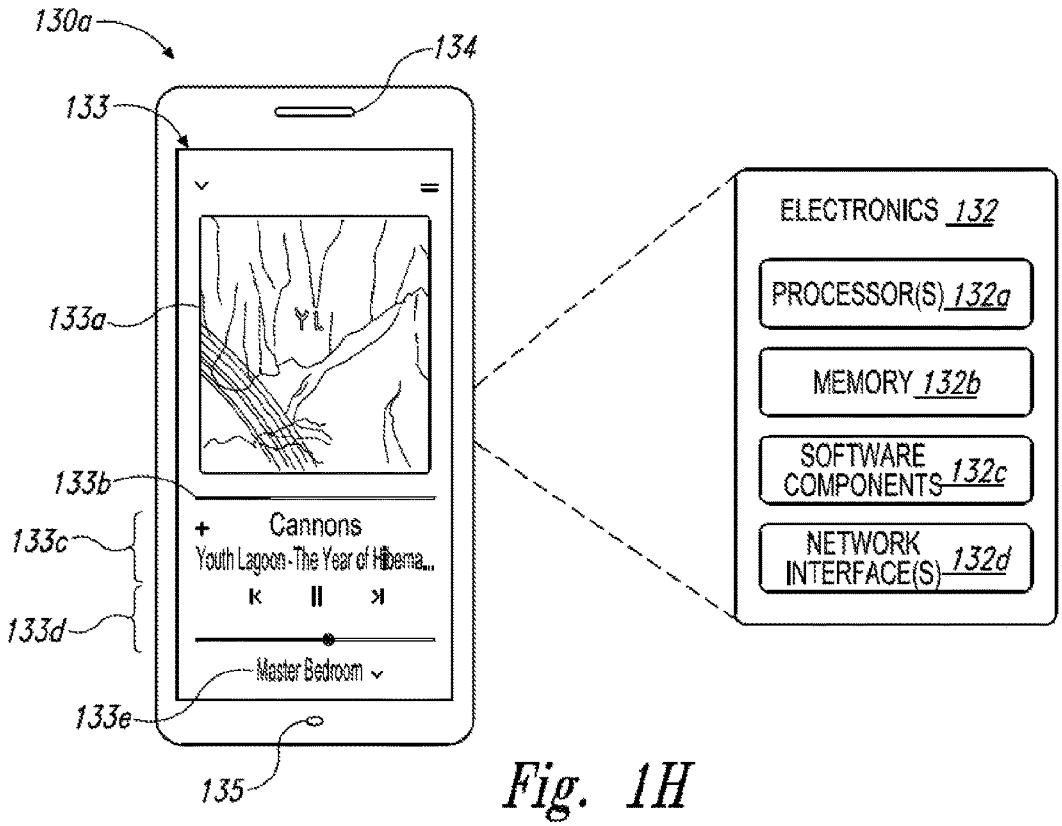
FIG. 1H shows a partially schematic diagram of a control device.
Figure 1I:
FIGS. 1-I through 1L show schematic diagrams of corresponding media playback system zones.
FIG. 1M shows a schematic diagram of media playback system areas.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system

100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
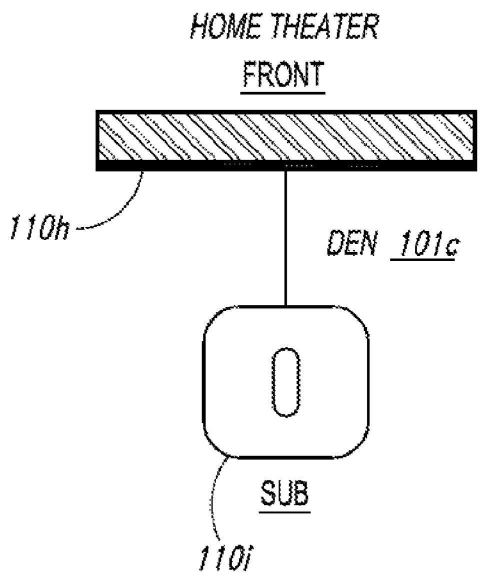
Figure 1K:
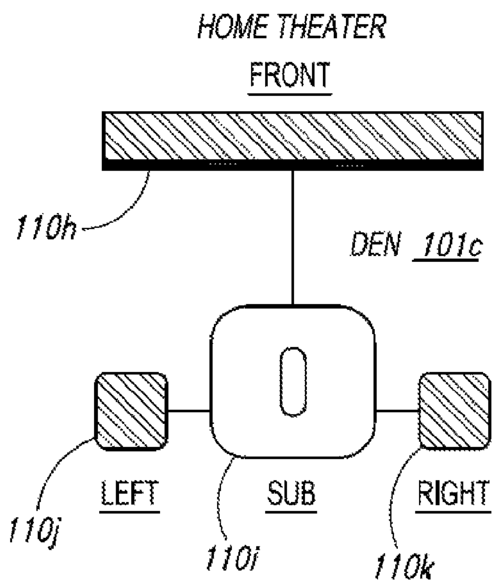
Figure 1L:
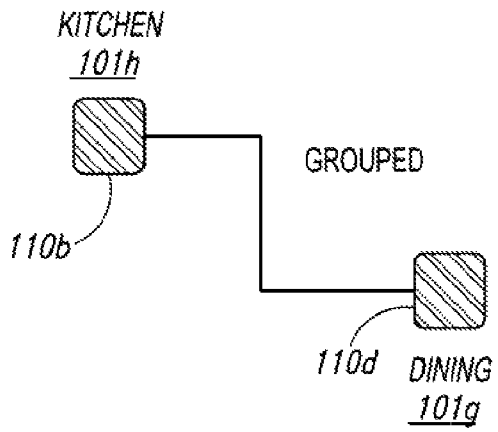
Figure 1M:
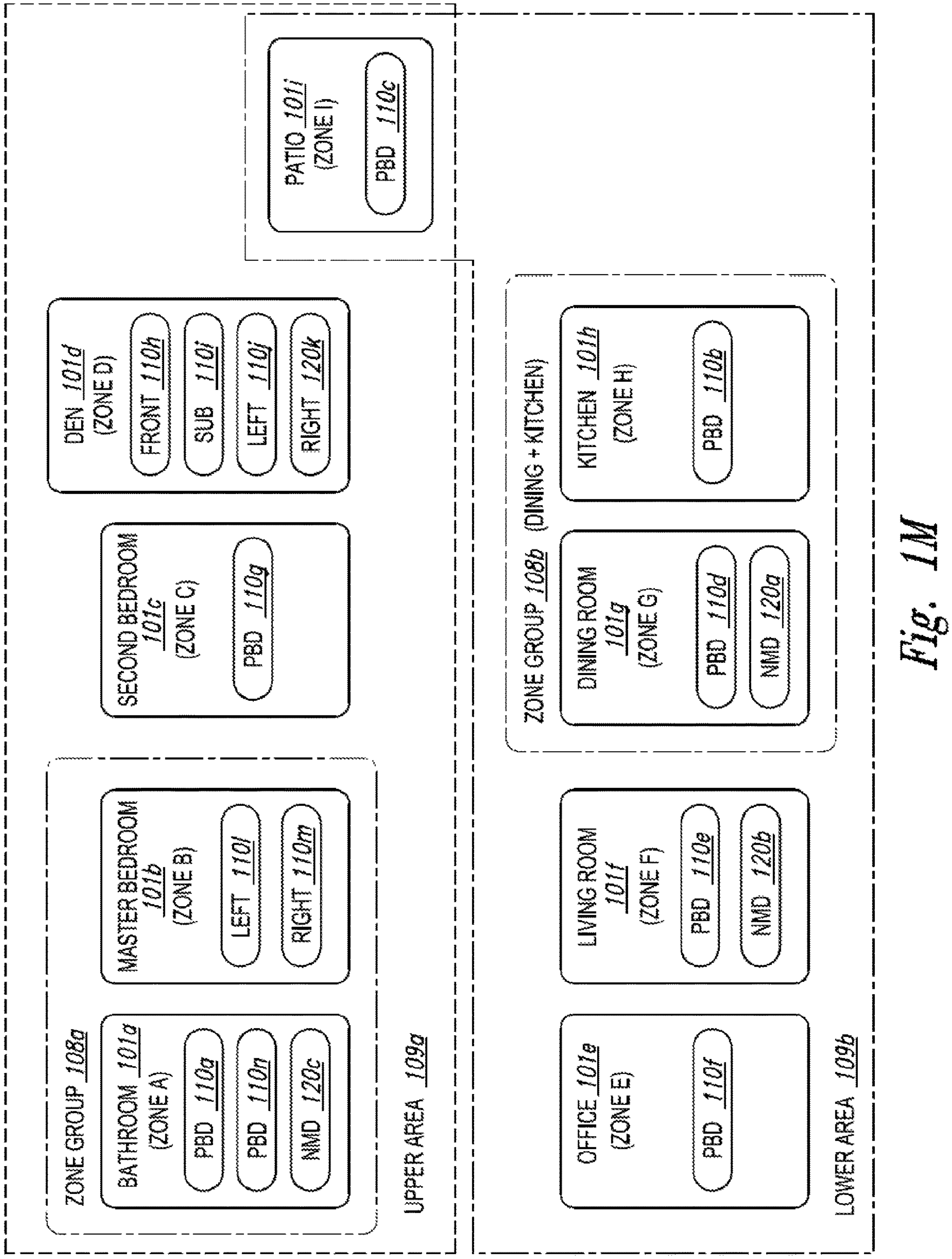

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio data in synchrony, each play audio data as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio data. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities and may each render the full range of audio data the respective playback device is capable of. Nevertheless, merged devices may be represented as a single UI entity (i.e., a zone, as discussed above). For instance, the playback devices 110*a* and 110*n* in the master bathroom have the single UI entity of Zone A. In one embodiment, the playback devices 110*a* and 110*n* may each output the full range of audio data each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio data.

In various implementations, the zones in an environment may be the default name of a zone within the group or a combination of the names of the zones within a zone group. For example, Zone Group 108*b* can be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
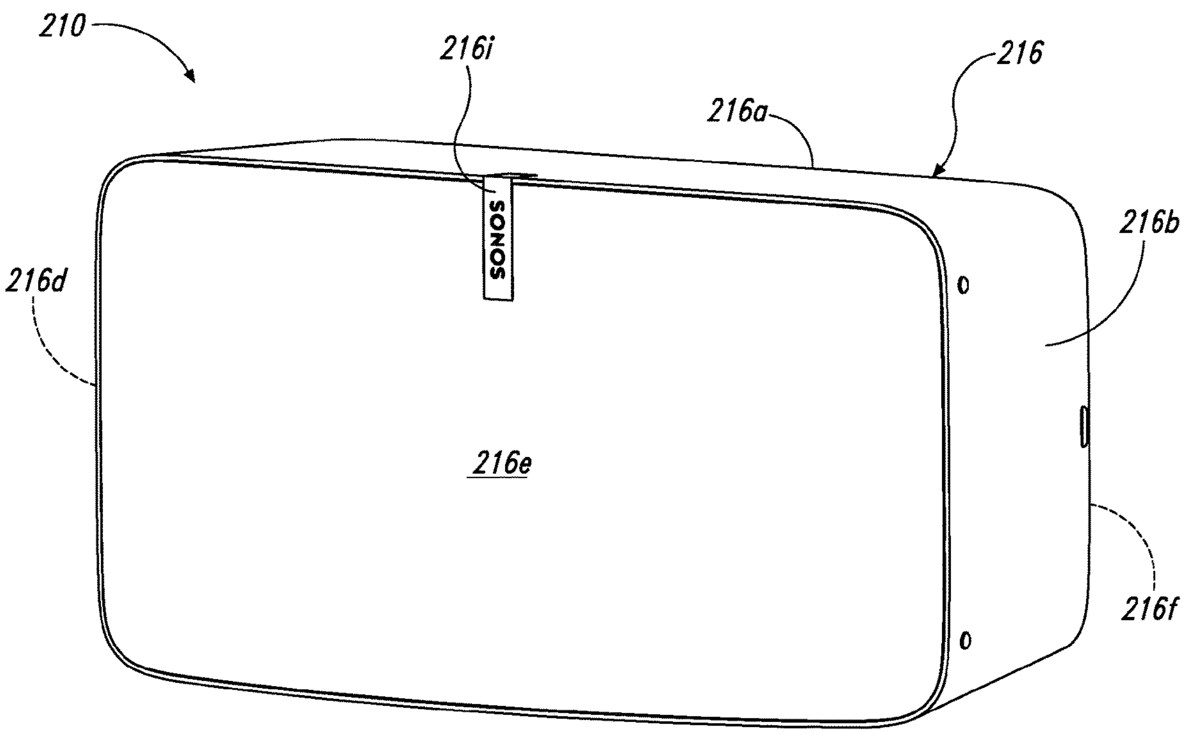
FIG. 2A shows a front isometric view of a playback device configured in accordance with aspects of the disclosed technology.
Figure 2B:
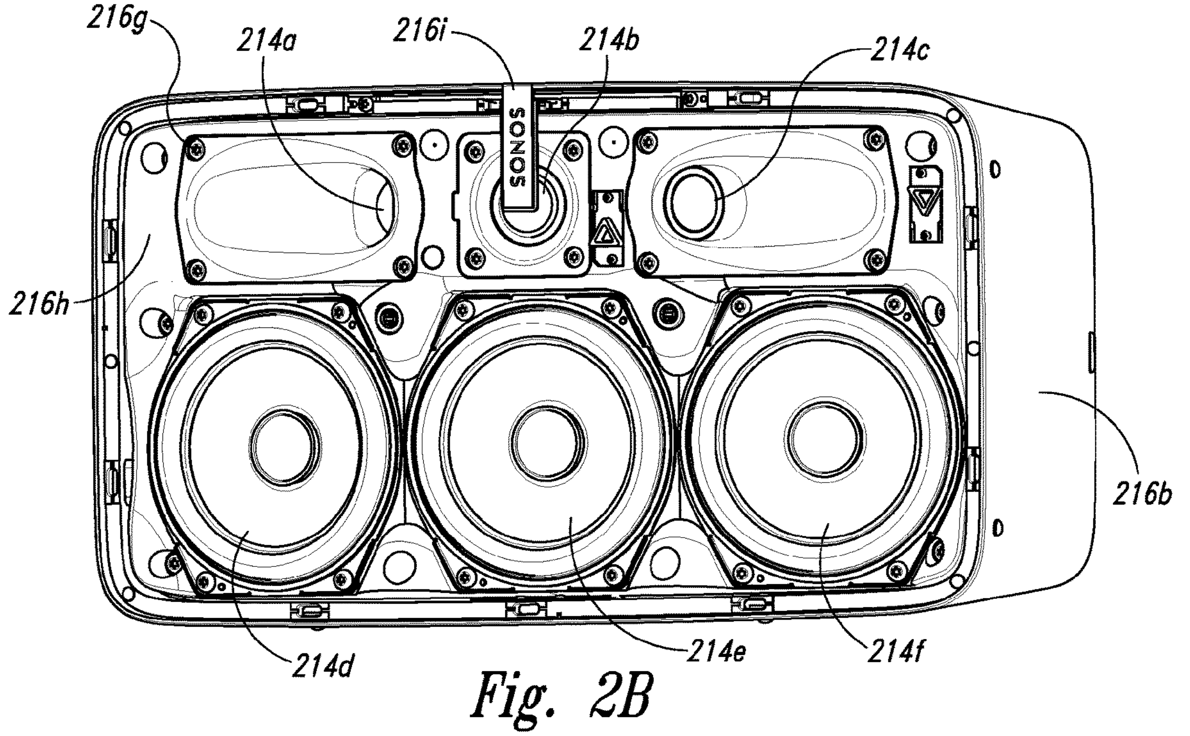
FIG. 2B shows a front isometric view of the playback device of FIG. 3A without a grille.
Figure 2C:
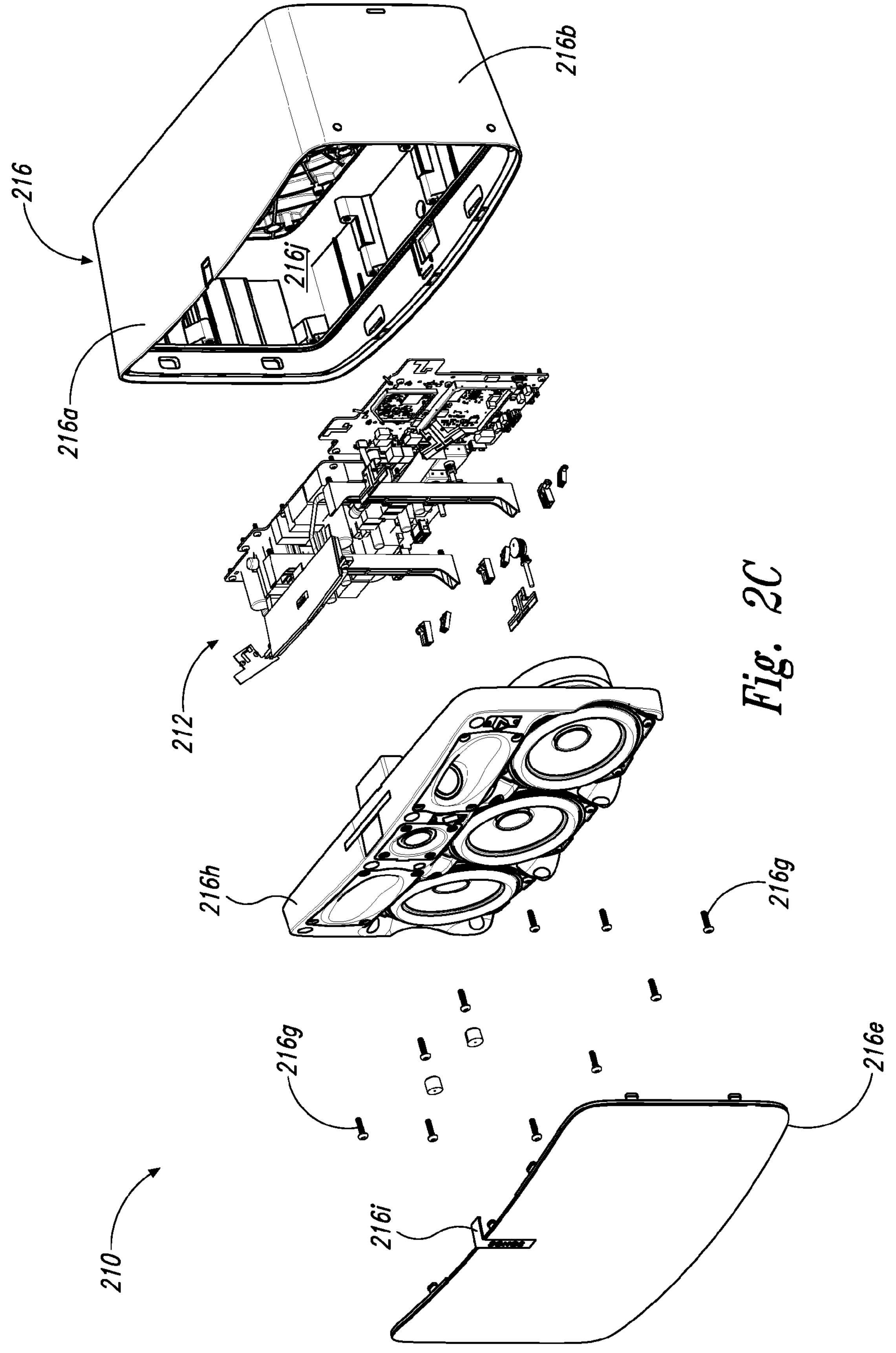
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio data from an audio source and send electrical signals corresponding to the audio data to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figure 3A:
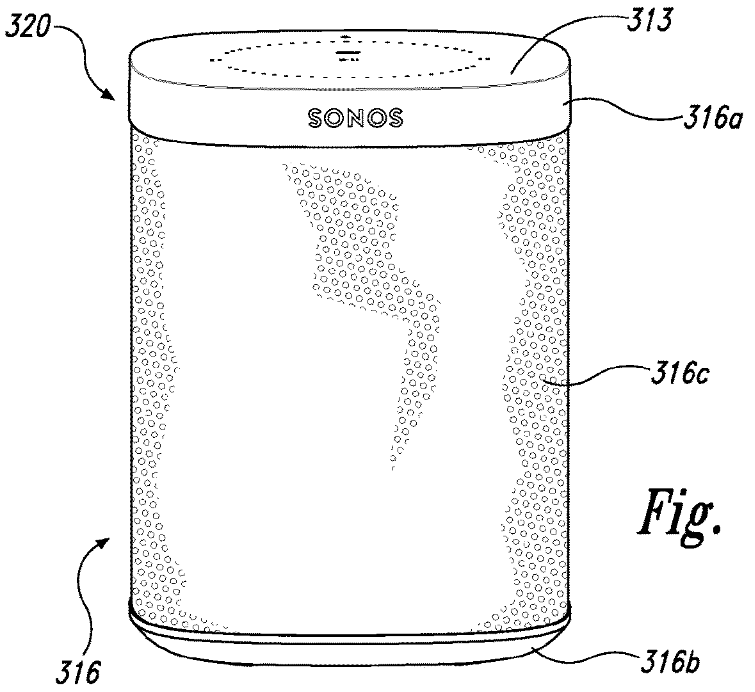
FIG. 3A shows a front view of a network microphone device configured in accordance with aspects of the disclosed technology.
Figure 3B:
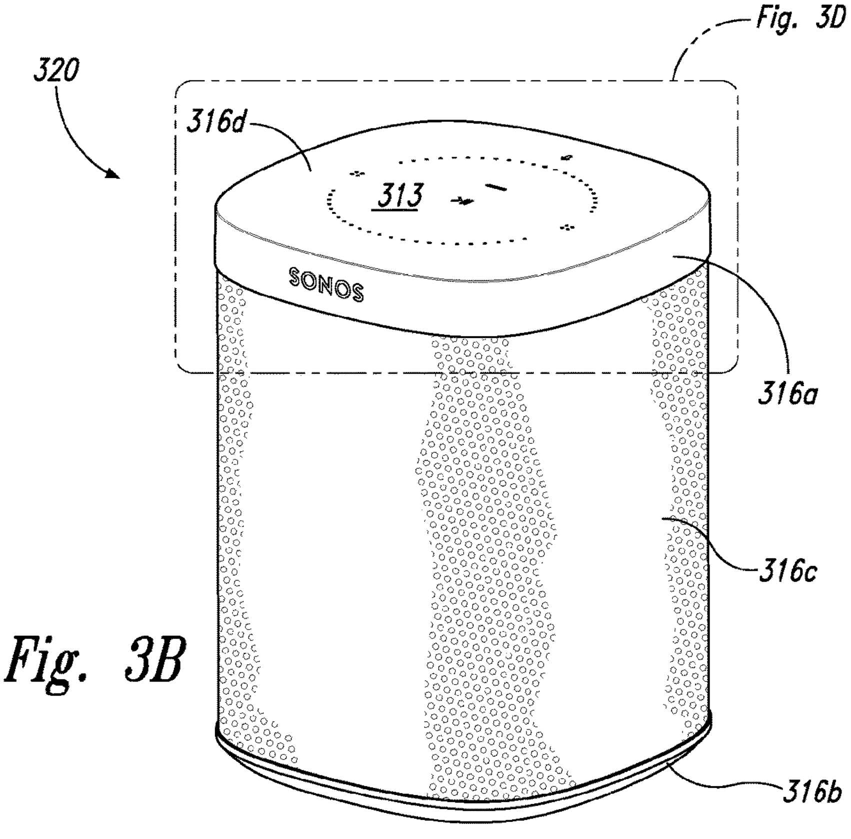
FIG. 3B shows a side isometric view of the network microphone device of FIG. 3A.
Figure 3C:
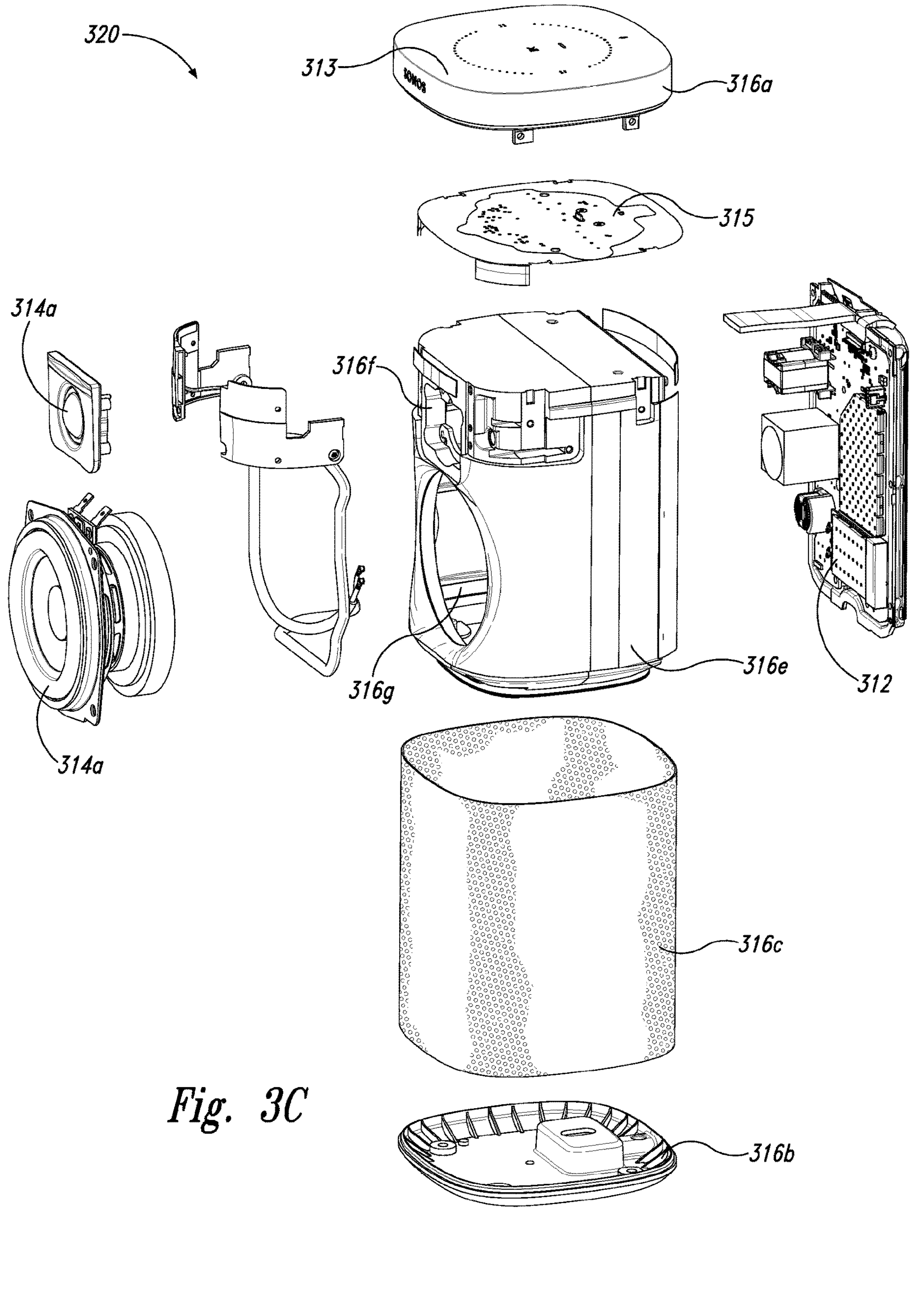
FIG. 3C shows an exploded view of the network microphone device of FIGS. 3A and 3B.
Figure 3D:
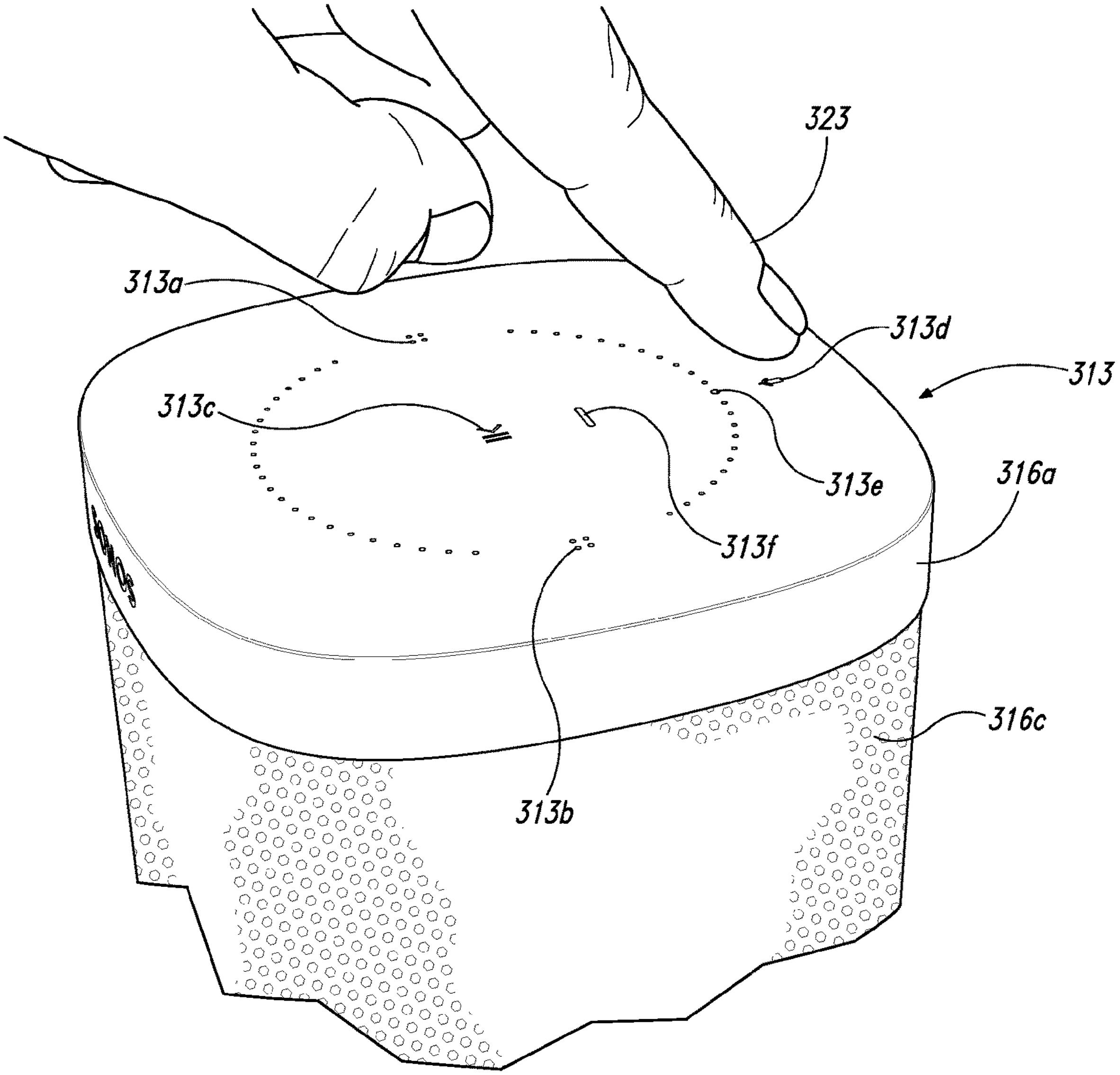
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f*(e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
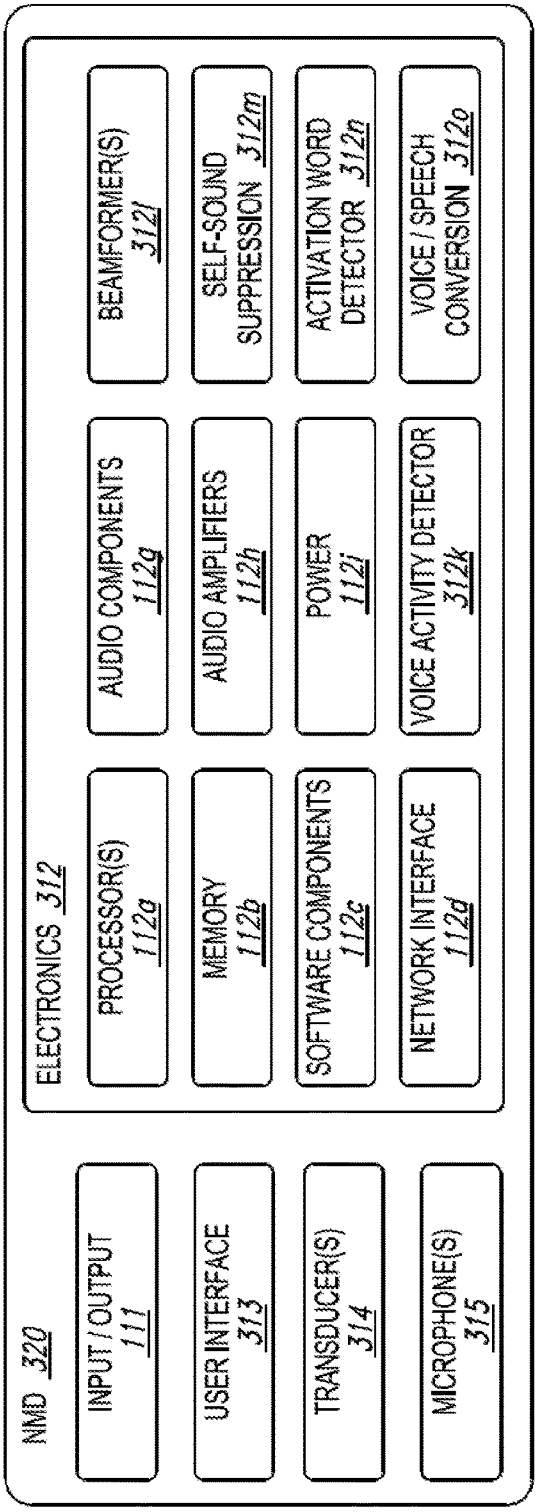
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g., AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
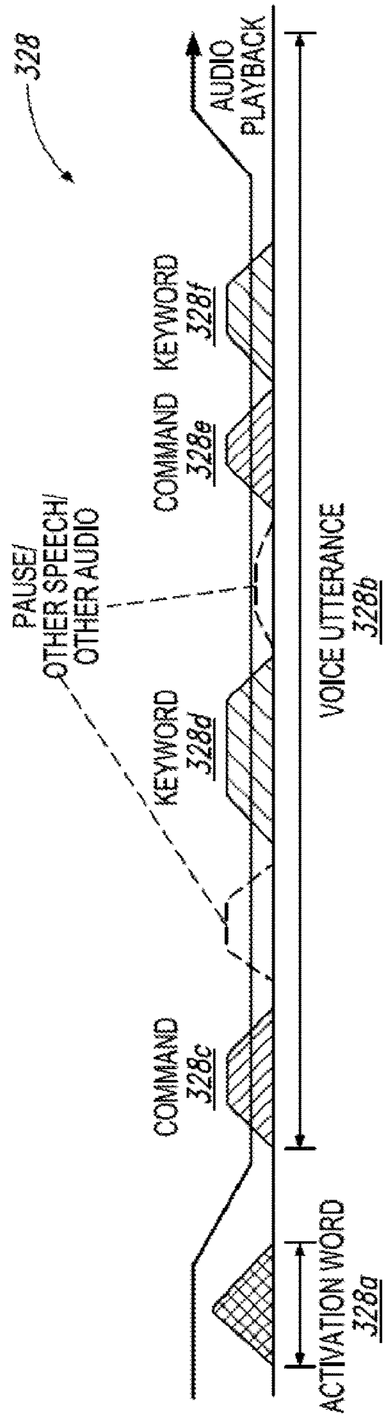
FIG. 3F shows a schematic diagram of an example voice input.

FIG. 3F is a schematic diagram of an example voice input 328 captured by the NMD 320 in accordance with aspects of the disclosure. The voice input 328 can include an activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328*a*. In addition, or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio data that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
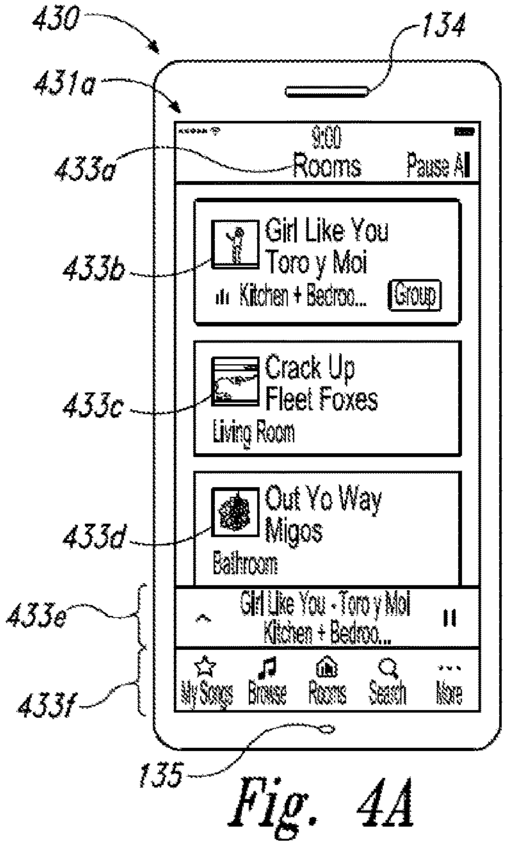
FIGS. 4A-4D show schematic diagrams of a control device in various stages of operation in accordance with aspects of the disclosed technology.
Figure 4B:
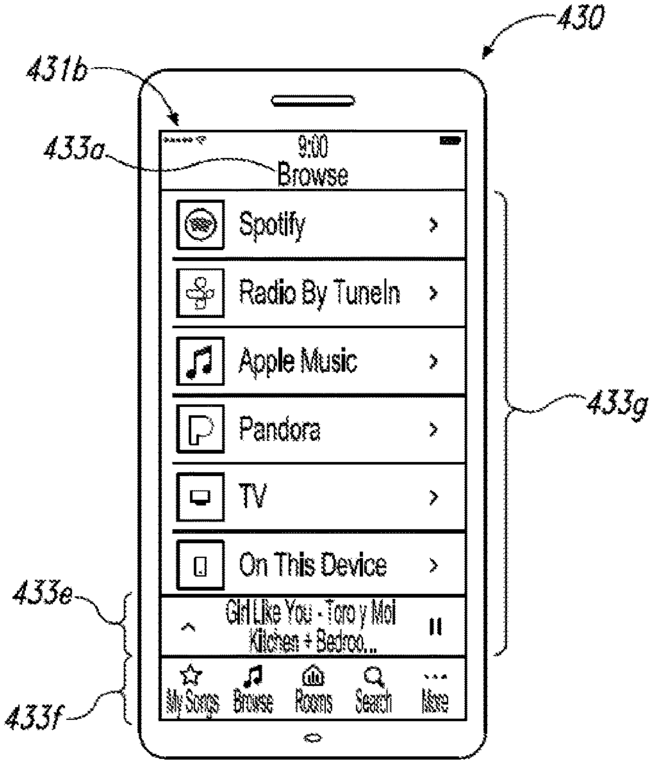
Figure 4C:
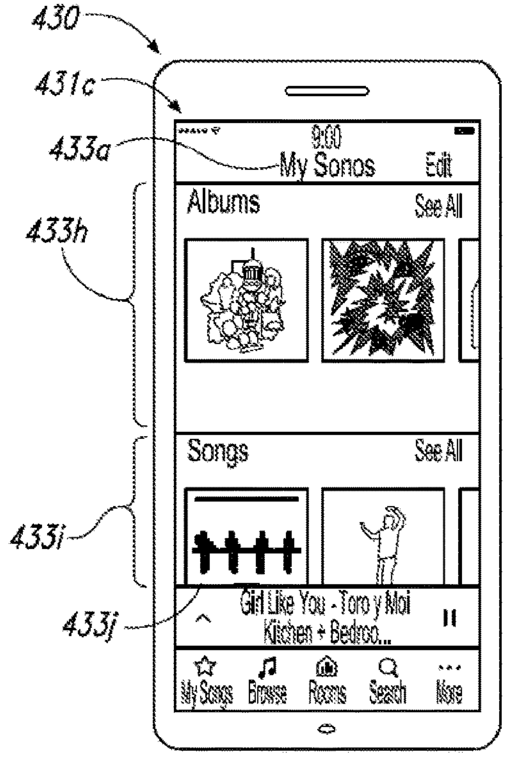
Figure 4D:
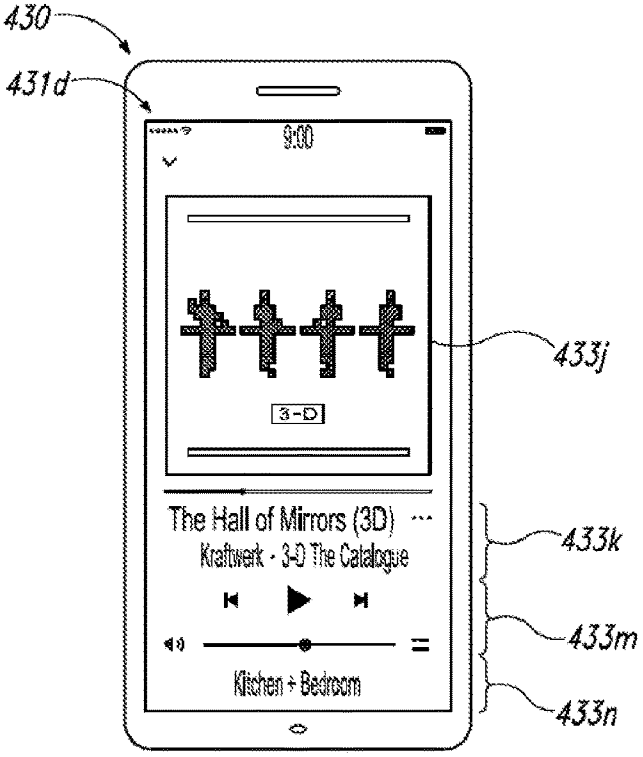

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
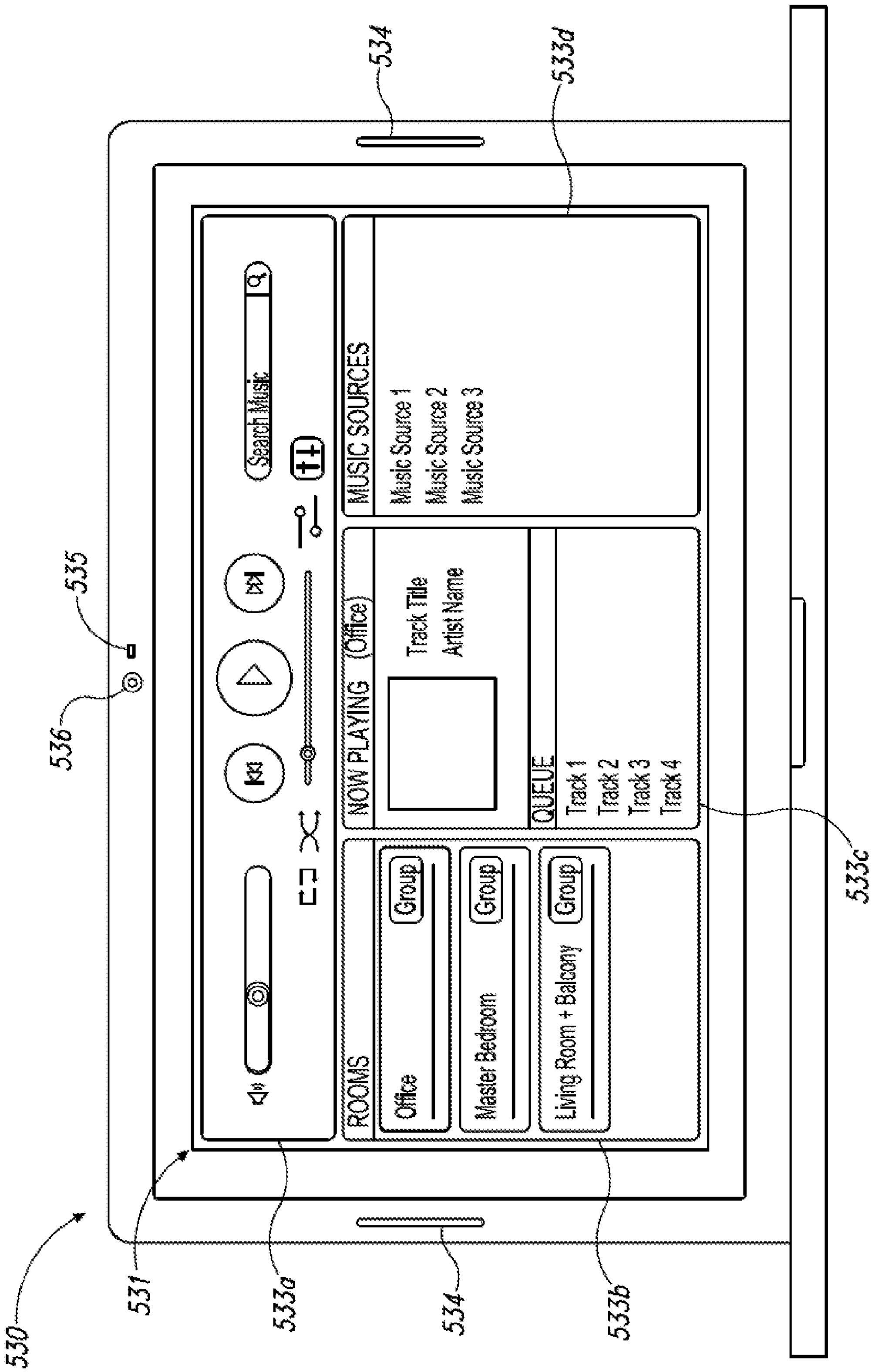
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones, the "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio data in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
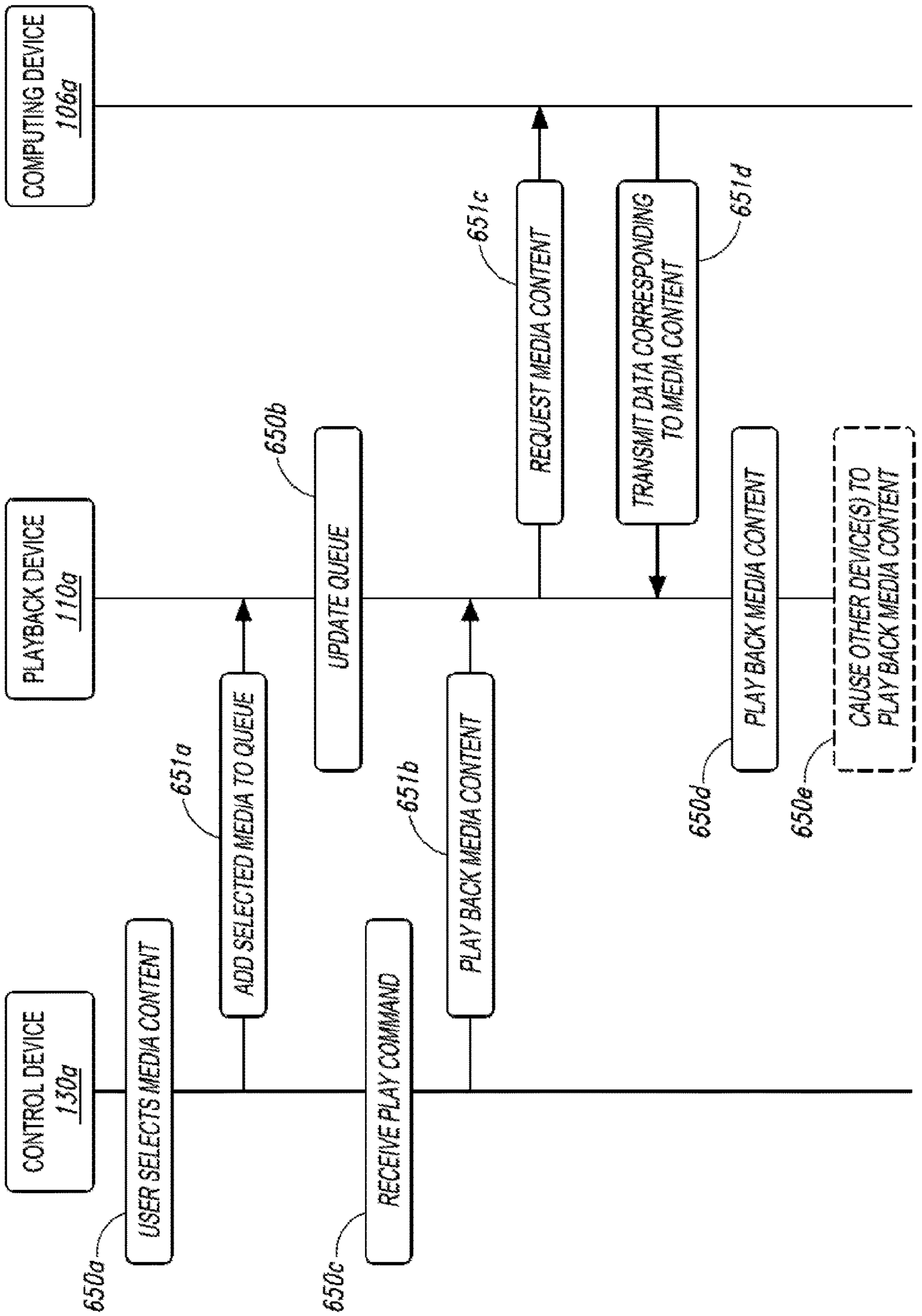
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110*a* such that all of the devices in the group play back the selected media content in synchrony.

IV. Technical Features Related to Wireless Streaming of Audio/Visual Content

In some embodiments, at least some aspects of the technical solutions derive from the technical structure and organization of the audio data, the playback timing, and the clock timing information that the playback devices use to play audio data in synchrony with each other or in some other groupwise fashion (e.g., in lip-synchrony with video data corresponding to the audio data), including how playback devices generate playback timing based on clock timing and play audio data based on playback timing and clock timing.

Therefore, to aid in understanding certain aspects of the disclosed technical solutions, certain technical details of the audio data, playback timing, and clock timing information, as well as how playback devices generate and/or use playback timing and clock timing for playing audio data are described below. Except where noted, the technical details of the audio data, playback timing, and clock timing information described below are the same or at least generally the same for the examples shown and described herein with reference to FIGS. 7-11.

a. Audio Data

Audio data may be any type of audio data now known or later developed. For example, in some embodiments, the audio data includes any one or more of: (i) streaming music or other audio obtained from a streaming media service, such as Spotify, Pandora. or other streaming media services; (ii) streaming music or other audio from a local music library, such as a music library stored on a user's laptop computer, desktop computer, smartphone, tablet, home server, or other computing device now known or later developed; (iii) audio data associated with video data, such as audio associated with a television program or movie received from any of a television, set-top box, Digital Video Recorder, Digital Video Disc player, streaming video service, or any other source of Audio/Visual (A/V) content now known or later developed; (iv) text-to-speech or other audible content from a voice assistant service (VAS), such as Amazon Alexa or other VAS services now known or later developed; (v) audio data from a doorbell or intercom system such as Nest, Ring, or other doorbells or intercom systems now known or later developed; and/or (vi) audio data from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio data from an audio source via an interface on the group coordinator, e.g., one of the group coordinator's wired or wireless data network interfaces, a "line-in" analog interface, a digital audio interface, or any other interface suitable for receiving audio data in digital or analog format now known or later developed.

An audio source is any system, device, or application that generates, provides, or otherwise makes available any of the aforementioned audio data to a group coordinator and/or playback device. Examples of audio sources include streaming media (audio, video) services, digital media servers or other computing systems, voice assistant services (VAS), televisions, cable set-top-boxes, streaming media players (e.g., AppleTV, Roku, gaming console), CD/DVD players, doorbells, intercoms, telephones/smartphones, tablets, or any other source of audio data now known or later developed.

As mentioned earlier, a playback device that receives or otherwise obtains audio data from an audio source for playback and/or distribution to other playback devices in a playback group is sometimes referred to herein as the group coordinator or "sourcing" device for the playback group.

One function of the group coordinator of a playback group in some embodiments is to process received audio data for playback and/or distribution to group members of the playback group for groupwise playback. In some embodiments, the group coordinator transmits the processed audio data to all the other group members in the playback group via a local area network, e.g., a WiFi network and/or wired Ethernet network. In some embodiments, the group coordinator transmits the audio data to a multicast network address (e.g., an IP multicast address or other type of multicast address), and all the group member playback devices configured to play the audio data (i.e., the group members of the playback group) receive the audio data via that multicast address. In some embodiments, the group coordinator broadcasts the audio data on a wireless channel and the group members in the playback group receive the broadcast. For example, in some embodiments, the group coordinator transmits the audio data to the group members via Connectionless Slave Broadcast (CSB) Bluetooth transmission or other type of broadcast or multicast transmission.

In some embodiments, the group coordinator receives audio data from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out. For example, in some embodiments, the group coordinator receives audio data from an audio source via the Internet. In some embodiments, the group coordinator may receive audio data from an audio source via an Advanced Audio Distribution Profile (A2DP) Bluetooth link.

In some embodiments, individual packets from an audio source may include both a timestamp and a sequence number. The timestamp is used to place the incoming packets of audio data in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio data is split across multiple RTP packets, multiple RTP packets may have the same timestamp.

In some embodiments, the group coordinator does not change the sequence number or identifier (or timestamp, if applicable) of a received packet during processing. But in some embodiments, the group coordinator may reorder at least a first set of packets in a packet stream received from an audio source (an inbound stream) based on each packet's sequence identifier, extract audio data from the received packets, reassemble a bitstream of audio content from the received packets, and then repacketize the reassembled bitstream into an outbound set of packets (an outbound stream), where packets in the outbound stream have sequence numbers and/or timestamps that differ from the sequence numbers and/or timestamps of the packets in the first set of packets (or first stream).

In some embodiments, individual packets in the outbound stream may be a different length (i.e., shorter or longer) than individual packets in the inbound stream. In some embodiments, reassembling a bitstream from the incoming packet stream and then subsequently repacketizing the reassembled bitstream into a different set of packets facilitates uniform processing and/or transmission of audio data by the group coordinator and uniform processing by the group members that receive the audio content from the group coordinator.

However, for some delay-sensitive audio content, reassembly and repacketization may be undesirable, and therefore, in some embodiments, the group coordinator may not perform reassembly and repacketization for some (or all) audio data that it receives before playing the audio data and/or transmitting the audio data to other playback devices/group members.

b. Playback Timing

In some embodiments, the playback devices disclosed and described herein use playback timing to play audio data in synchrony with each other. In some embodiments, the playback devices additionally use the playback timing to play audio data in lip synchrony with a display device's playback of video data associated with the audio data. And in some embodiments, a television (or other display device) additionally uses the playback timing to display frames of video data in lip synchrony with playback of corresponding audio data by the audio playback devices.

An individual playback device can generate playback timing and/or playback audio data according to playback timing, based on the playback device's configuration in the playback group. The sourcing playback device (acting as a group coordinator) that generates the playback timing for audio data also transmits that generated playback timing to all the playback devices that are configured to play the audio data (the group members). In some home theater embodiments, (i) the sourcing device (acting as a group coordinator) may be any of a soundbar, a streaming media receiver, a home theater headend, or any other type of computing device configured to perform the sourcing device/group coordinator functions disclosed and described herein, and (ii) the group members may include one or more playback devices, such as a soundbar playback device, subwoofer playback device, side satellite playback device, rear satellite playback device, or any other type of computing device equipped with one or more speakers and configured to perform the group member functions disclosed and described herein.

In some embodiments, the group coordinator transmits playback timing separately from the audio data. For example, in some embodiments, the group coordinator may (i) transmit audio data to the group members via Connectionless Slave Broadcast (CSB) Bluetooth transmission and (ii) transmit playback timing for the audio content via a Bluetooth or Bluetooth Low Energy (BLE) transmission.

In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some embodiments, the playback timing is generated for individual frames (or packets) of audio data. In some embodiments, the audio data is packaged in a series of frames (or packets) where individual frames (or packets) comprise a portion of the audio data. In some embodiments, the playback timing for the audio data includes a playback time for each frame (or packet) of audio data. In some embodiments, the playback timing for an individual frame (or packet) is included within the frame (or packet), e.g., in the header of the frame (or packet), in an extended header of the frame (or packet), and/or in the payload portion of the frame (or packet). But as described earlier, in some embodiments, the group coordinator transmits playback timing for one or more individual frames separately from the audio data.

In some embodiments, the playback time for an individual frame (or packet) is identified within a timestamp or other indication. In such embodiments, the timestamp (or other indication) represents a time to play the one or more portions of audio data within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated. As described in more detail below, the reference clock can be a "local" clock at the group coordinator or a "remote" clock at a separate network device, e.g., another playback device, a computing device, or another network device configured to provide clock timing for use by playback devices to generate playback timing and/or playback audio data.

In operation, a playback device tasked with playing particular audio data will play the portion(s) of the particular audio data within an individual frame (or packet) at the playback time specified by the playback timing for that individual frame (or packet), as adjusted to accommodate for differences between the clock timing information and a clock at the playback device that is tasked with playing the audio data, as described in more detail below.

c. Reference Clock Timing

The playback devices disclosed and described herein use clock timing from a reference clock to generate playback timing for audio data and to play audio based on the audio data and the generated playback timing.

In some embodiments, the group coordinator uses clock timing from a reference clock (e.g., a device clock, a digital-to-audio converter clock, a playback time reference clock, or any other clock) to generate playback timing for audio data that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio data.

In some embodiments, all of the playback devices tasked with playing particular audio data in synchrony (i.e., all the group members in a playback group) use the same clock timing from the same reference clock to play back that particular audio data in synchrony with each other. In some embodiments, playback devices use the same clock timing to play audio data that was used to generate the playback timing for the audio data.

In some embodiments, the device that generates the clock timing also transmits the clock timing to all the playback devices that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio data (e.g., the group members, and perhaps the group coordinator too if the group coordinator is not the device generating the clock timing) receive the clock timing via that multicast address. In some embodiments, the device that generates the clock timing alternatively transmits the clock timing to each unicast network address of each playback device in the playback group.

In some embodiments, the device that generates the clock timing is a playback device configured to operate as the group coordinator for the playback group. And in operation, the group coordinator of the playback group transmits the clock timing to all the group members of the playback group. In some embodiments, the group coordinator transmits the clock timing to all playback group members via a multicast network address. In some embodiments, the group coordinator transmits clock timing to individual group members via each group member's unicast network address. In some embodiments, the coordinator transmits clock timing to individual group members via a Bluetooth or Bluetooth Low Energy (BLE) transmission, or via any other transmission scheme suitable for transmitting clock timing information now known or later developed. And in some embodiments, the group coordinator and the group members all use the clock timing and the playback timing to play audio data in a groupwise manner. In some embodiments, the group coordinator and the group members all use the clock timing and the playback timing to play audio data in synchrony with each other.

In some embodiments, the device that generates the clock timing may additionally send the clock timing to a television (or other display device). In such embodiments, the television uses the clock timing and playback timing to display frames of video data associated with the audio data in lip synchrony with playback of the corresponding audio data by the audio playback devices in the playback group.

d. Generating Playback Timing by the Group Coordinator

In some embodiments, the group coordinator: (i) generates playback timing for audio data based on clock timing from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio data transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages in connection with configuring a playback group for groupwise playback of audio and/or audio/video content. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio data until after one or more other group members have already played the portions of audio data) or a shorter timing advance would be sufficient (e.g., because the group member is buffering more packets comprising portions of audio data than necessary to provide consistent, reliable playback).

As described in more detail below, all the playback devices in a playback group configured to play the audio data in synchrony will use the playback timing and the clock timing to play the audio data in synchrony with each other.

e. Generating Playback Timing with Clock Timing from a Remote Reference Clock

In some embodiments, the group coordinator may generate playback timing for audio data based on clock timing from a remote clock at another network device, e.g., another playback device, another computing device (e.g., a smartphone, laptop, media server, cloud server, or other computing device or computing system configurable to provide clock timing sufficient for use by the group coordinator to generate playback timing and/or playback audio data). Generating playback timing based on clock timing from a remote clock at another network device is more complicated than generating playback timing based on clock timing from a local clock in embodiments where the same clock timing is used for both (i) generating playback timing and (ii) playing audio data based on the playback timing.

In embodiments where the group coordinator generates playback timing for audio data based on clock timing from a remote clock, the playback timing for an individual frame (or packet) is based on (i) a "timing offset" between (a) a local clock at the group coordinator that the group coordinator uses for generating the playback timing and (b) the clock timing information from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio data received from the group coordinator for playback.

For an individual frame (or packet) containing a portion(s) of the audio data, the group coordinator generates playback timing for that individual frame (or packet) by adding the sum of the "timing offset" and the "timing advance" to a current time of the local clock at the group coordinator that the group coordinator uses to generate the playback timing for the audio data. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio data, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio data transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio data playback latency requirements because different audio data may have different latency requirements. For example, audio data having associated video data may have lower latency requirements than audio data that does not have associated video data because audio data associated with video data must be played in lip synchrony with its corresponding video data whereas audio data that is not associated with video data need not be synchronized with any corresponding video data. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio data).

As described in more detail below, all the playback devices configured to play the audio data in synchrony will use the playback timing and the clock timing to play the audio data in synchrony with each other.

f. Playing Audio Content using Local Playback Timing and Local Clock Timing

In some embodiments, the group coordinator is configured to play audio data in synchrony with one or more group members. And if the group coordinator is using clock timing from a local clock at the group coordinator to generate the playback timing, then the group coordinator will play the audio data using locally-generated playback timing and the locally-generated clock timing. In operation, the group coordinator plays an individual frame (or packet) comprising portions of the audio data when the local clock that the group coordinator used to generate the playback timing reaches the time specified in the playback timing for that individual frame (or packet).

For example, recall that when generating playback timing for an individual frame (or packet), the group coordinator adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio data in an individual frame (or packet) 30 milliseconds after creating the playback timing for that individual frame (or packet).

In this manner, the group coordinator plays audio data by using locally-generated playback timing and clock timing from a local reference clock at the group coordinator. By playing the portion(s) of the audio data of an individual frame and/or packet when the clock time of the local reference clock reaches the playback timing for that individual frame or packet, the group coordinator plays that portion(s) of the audio data in that individual frame and/or packet in synchrony with other group members in the playback group.

g. Playing Audio Content using Local Playback Timing and Remote Clock Timing

As mentioned earlier, in some embodiments, a group coordinator generates playback timing for audio data based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device to generate playback timing and/or playback audio data). Because the group coordinator used clock timing from the remote clock to generate the playback timing for the audio data, the group coordinator also uses the clock timing from the remote clock to play the audio data. In this manner, the group coordinator plays audio data using the locally-generated playback timing and the clock timing from the remote clock.

Recall that, in embodiments where the group coordinator generates playback timing for audio data based on clock timing from a remote clock, the group coordinator generates the playback timing for an individual frame (or packet) based on (i) a "timing offset" based on a difference between (a) a local clock at the group coordinator and (b) the clock timing information from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio data received from the group coordinator for playback. And further recall that the group coordinator transmits the generated playback timing to all of the group members in the playback group tasked with playing the audio data in synchrony.

In this scenario, to play an individual frame (or packet) of audio data in synchrony with the one or more other group members, the group coordinator subtracts the "timing offset" from the playback timing for that individual frame (or packet) to generate a "local" playback time for playing audio based on the audio data within that individual frame (or packet). After generating the "local" playback time for playing the portion(s) of the audio data within the individual frame (or packet), the group coordinator plays the portion(s) of the audio data in the individual frame (or packet) when the local clock that the group coordinator is using to play the audio data reaches the "local" playback time for that individual frame (or packet). By subtracting the "timing offset" from the playback timing to generate the "local" playback time for an individual frame, the group coordinator effectively plays the portion(s) of audio data in that frame/packet with reference to the clock timing from the remote clock.

h. Playing Audio Content using Remote Playback Timing and Local Clock Timing

Recall that, in some embodiments, the group coordinator transmits the audio data and the playback timing for the audio data to one or more group members. If the group member that receives (i.e., the receiving group member) the audio data and playback timing from the group coordinator is the same group member that provided clock timing information to the group coordinator that the group coordinator used for generating the playback timing, then the receiving group member in this instance plays audio data using the playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio data. In this manner, the receiving group member plays audio data using the remote playback timing (i.e., from the group coordinator) and the clock timing from its local clock (i.e., its local clock timing).

To play an individual frame (or packet) of the audio data in synchrony with the group coordinator (and every other group member that receives the playback timing from the group coordinator and clock timing from the receiving group member), the receiving group member (i) receives the frames (or packets) comprising the portions of the audio data from the group coordinator, (ii) receives the playback timing for the audio data from the group coordinator (e.g., in the frame and/or packet headers of the frames and/or packets comprising the portions of the audio data or perhaps separately from the frames and/or packets comprising the portions of the audio data), and (iii) plays the portion(s) of the audio data in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio data when the receiving group member's local clock (that was used to generated the clock timing) reaches the playback time for an individual frame (or packet) specified in the playback timing for that individual frame (or packet).

And because the receiving group member plays frames (or packets) comprising portions of the audio data according to the playback timing, and because the group coordinator plays frames (or packets) comprising the same portions of the audio data according to the playback timing and the determined "timing offset," the receiving group member and the group coordinator play frames (or packets) comprising the same audio data in synchrony, i.e., at the same time or at substantially the same time.

i. Playing Audio Content using Remote Playback Timing and Remote Clock Timing

Recall that, in some embodiments, the sourcing playback device (e.g., which in many cases may be the group coordinator) transmits the audio data and the playback timing for the audio data to one or more other playback devices in the synchrony group. And further recall that, in some embodiments, the network device providing the clock timing can be a different device than the playback device providing the audio data and playback timing (i.e., the sourcing playback device, which in many cases may be the group coordinator). Playback devices that receive the audio data, the playback timing, and the clock timing from one or more other devices are configured to playback the audio data using the playback timing from the device that provided the playback timing (i.e., remote playback timing) and clock timing from a clock at the device that provided the clock timing (i.e., remote clock timing). In this manner, the receiving group member in this instance plays audio data by using remote playback timing and remote clock timing.

To play an individual frame (or packet) of the audio data in synchrony with every other playback device tasked with playing audio data in the playback group, the receiving playback device (i) receives the frames (or packets) comprising the portions of the audio data, (ii) receives the playback timing for the audio data (e.g., in the frame and/or packet headers of the frames and/or packets comprising the portions of the audio data or perhaps separately from the frames and/or packets comprising the portions of the audio data), (iii) receives the clock timing, and (iv) plays the portion(s) of the audio data in the individual frame (or packet) when the local clock that the receiving playback device uses for audio data playback reaches the playback time specified in the playback timing for that individual frame (or packet), as adjusted by a "timing offset."

In operation, after the receiving playback device receives clock timing, the receiving device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio data. In operation, each playback device that receives the clock timing from another device calculates its own "timing offset" based on the difference between its local clock and the clock timing, and thus, the "timing offset" that each playback device determines is specific to that particular playback device.

In some embodiments, when playing back the audio data, the receiving playback device generates new playback timing (specific to the receiving playback device) for individual frames (or packets) of audio data by adding the previously determined "timing offset" to the playback timing for each received frame (or packet) comprising portions of audio data. With this approach, the receiving playback device converts the playback timing for the received audio data into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio data reaches the "local" playback time for an individual frame (or packet), the receiving playback device plays the audio data (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio data.

Because the receiving playback device plays frames (or packets) comprising portions of the audio data according to the playback timing as adjusted by the "timing offset" relative to the clock timing, and because the device providing the playback timing generated the playback timing for those frames (or packets) relative to the clock timing and plays frames (or packets) comprising the same portions of the audio data according to the playback timing and its determined "timing offset," the receiving playback device and the device that provided the playback timing (e.g., the group coordinator in some embodiments) play frames (or packets) comprising the same portions of the audio data in synchrony with each other, i.e., at the same time or at substantially the same time.

Figure 7A:
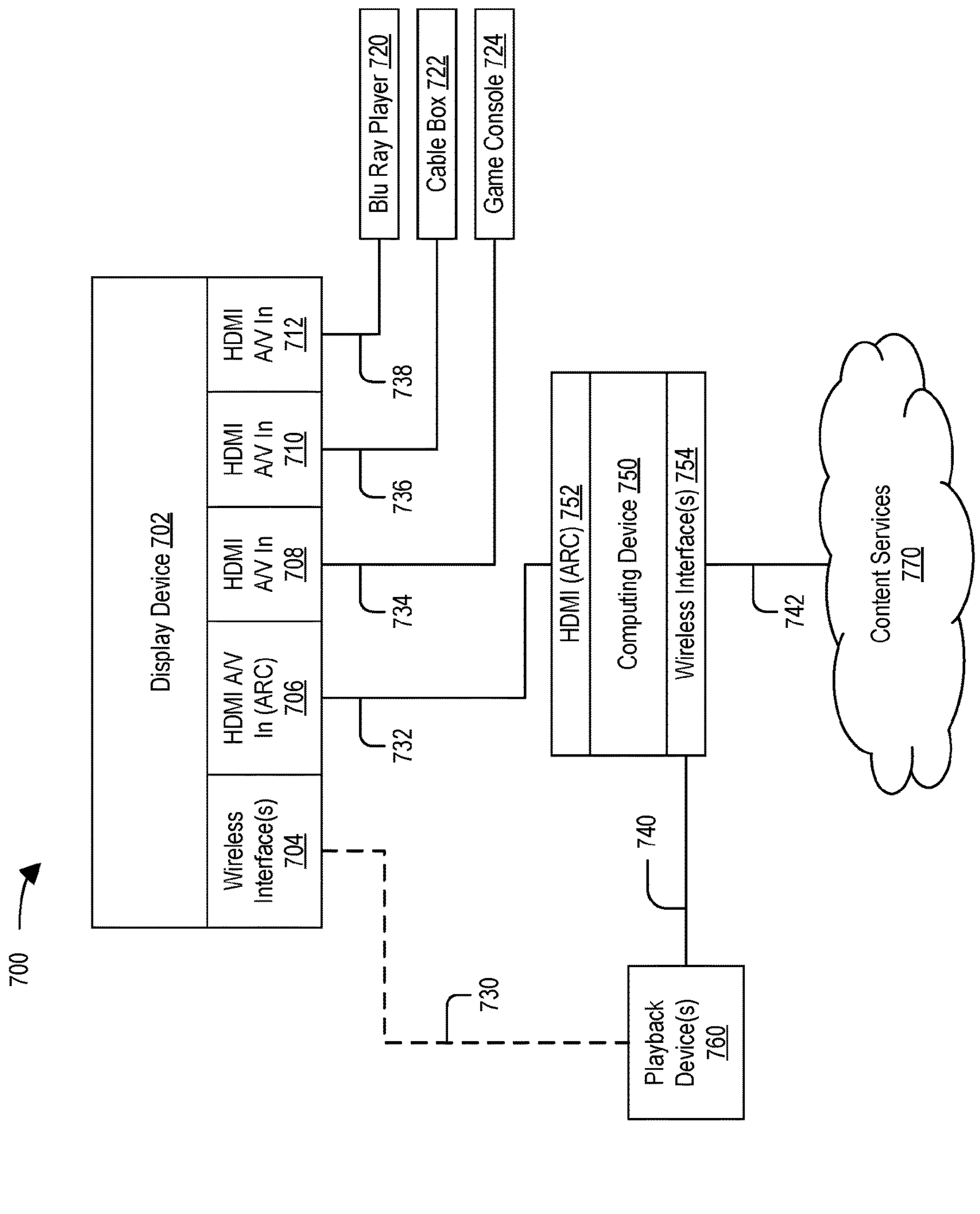
FIG. 7A shows an example system configured for wireless streaming of audio/visual content according to some embodiments.

VI. Example Embodiments Related to Wireless Transmission of Audio/Visual Content FIG. 7A shows an example system 700 configured for wireless streaming of audio/visual content according to some embodiments.

System 700 includes a display device 702, a Blu Ray player 720, a cable box 722, a game console 724, a computing device 750, and one or more playback devices 760. The communication links shown between the devices in system 700 may be wired or wireless communications links.

The display device 702 may be a television or any other type of device configured to display video data, e.g., a monitor, projector, or similar display device. Display device 702 includes one or more wireless interfaces 704 (e.g., WiFi and/or Bluetooth interfaces), HDMI A/V input 706 with Audio Return Channel (ARC), and HDMI interfaces 708-712. HDMI interfaces 708-712 may include HDMI-ARC in some embodiments. In operation, the HDMI links may be physical HDMI links or wireless HDMI links. In some embodiments, the interfaces 706, 708, 710, 712, and 752 (and corresponding links 732, 734, 736, and 738) may operate according to a wired or wireless protocol other than HDMI that is sufficient for transmitting audio/video content, such as FireWire, USB-C, Thunderbolt, WiFi, Ethernet, Bluetooth, or any other suitable protocol now known or later developed.

In operation, display device 702 is configured to receive audio/video (A/V) content comprising audio data and video data corresponding to the audio data from any of (i) Blu Ray player 720 via HDMI link 738, (ii) cable box 722 via HDMI link 736, (iii) game console 724 via HDMI link 734, and (iv) content services 770 (e.g., from the Internet), computing device 750, playback device(s) 760, or another computing device (not shown) via wireless interface(s) 704. Display device 702 is also configured to receive at least the video data of the A/V content from computing device 750 via HDMI link 732, although display device 702 may receive both the audio data and video data of the A/V content from computing device 750 via HDMI link 732.

The Blu Ray player 720, cable box 722, game console 724, and content services 770 are all sources of A/V content that comprises audio data and video data. In addition to the Blu Ray player 720, cable box 722, game console 724, and content services 770, the display device 702 may additionally or alternatively be configured to receive A/V content from any other A/V content source now known or later developed.

In some embodiments where the display device 702 receives A/V content from any of HDMI interfaces 708-712 or wireless interface(s) 704, the display device 702 is additionally configured to transmit the audio data of the A/V content to the computing device 750 via link 732. In embodiments where the display device 702 receives A/V content from the computing device 750, the display device need not additionally transmit the audio data of the A/V content back to the computing device 750 via link 732. However, the display device 702 may transmit the audio data of the A/V content back to the computing device 750 via link 732 in some embodiments.

Computing device 750 comprises HDMI (ARC) interface 752 and wireless interface(s) 754. In some embodiments, computing device 750 is a playback device that includes one or more speakers, such as a home theater soundbar or other playback device. In some embodiments, computing device 750 is the same as or similar to any of the playback devices disclosed and described herein. In some embodiments, the computing device 750 comprises one or more processors and tangible, non-transitory computer-readable media with instructions stored in the computer-readable media, where the instructions, when executed by the one or more processors, cause the computing device 750 to perform one or more of the features and/or functions disclosed and described herein.

In some embodiments, computing device 750 is configured to perform one or more (or all) functions of a group coordinator for a group of playback devices, such as playback device(s) 760, e.g., by performing any one or more (or all) of the group coordinator functions disclosed and described herein, including but not limited to (i) generating clock timing, (ii) sourcing audio data, (iii) generating playback timing for audio data, (iv) distributing clock timing, audio data, and playback timing to playback devices in a playback group, and/or (v) playing audio data in synchrony with playback devices in the playback group, including playing the audio data in lip-synchrony with display of corresponding video data by the display device 702.

The playback device(s) 760 may be the same as or similar to any of the playback devices disclosed and described herein, including but not limited to a home theater soundbar or other playback device. In operation, the playback device(s) 760 are configured to play audio based on (i) clock timing received from a reference clock, (ii) audio data, and (iii) playback timing for the audio data.

In some embodiments, the computing device 750 is configured to operate in one of at least two media distribution modes: (1) a low latency mode and (2) a distributed buffering mode.

While operating in the low latency mode, the computing device 750 is configured to (i) generate playback timing for individual frames of the audio data, where the playback timing comprises, for an individual frame of audio data, an indication of a corresponding future time that is within a first duration of time from a current clock time of the computing device 750, and where the future time for the individual frame specifies a time at which the playback device(s) 760 are to play the individual frame of audio data in lip-synchrony with the video data associated with the audio data, and (ii) transmit the playback timing and the audio data to the playback device(s) 760 for playback according to the playback timing. In some embodiments, the computing device 750 may additionally transmit clock timing information to the playback device(s) 760 while operating in the low latency mode. In operation, the first duration of time used in the low latency mode is very short, e.g., on the order of between 5 and 100 milliseconds.

In operation, the computing device 750 is configured to operate in the low latency mode in scenarios where the computing device 750 receives audio data from the display device 702 via link 732. In such scenarios, the display device 702 (*i*) receives A/V content from a media source other than the computing device 750 (e.g., any source received via HDMI interfaces 708, 710, 712 or wireless interface(s) 704), (ii) displays the video data of the A/V content, and (iii) transmits the audio data of the A/V content to the computing device 750 via HDMI ARC link 732.

In such scenarios, the computing device 750 must process and audio data received at HDMI (ARC) interface 752 and distribution the audio data to the playback device(s) 760 fast enough so that the playback device(s) 760 have time to receive, process, and play the audio data in lip-synchrony with the corresponding video data played by the display device 702. In embodiments where computing device 750 is also a playback device, then the computing device 750 also plays the audio data in synchrony with the playback device(s) 760 and in lip-synchrony with the playback of the corresponding video data of the A/V content by the display device 702.

For example, in some embodiments, the computing device 750 is configured to operate in the low latency mode when the audio data of the A/V content is sourced from any of the Blu Ray player 720, cable box 722, or game console 724. The computing device 750 may also operate in the low latency mode when the audio data of the A/V content is sourced from a content service 770 in scenarios where the display device 702 receives the A/V content from the content service 770 via wireless interface(s) 704 and then provides the audio data of the A/V content to the computing device 750 via the HDMI ARC link 732.

While operating in the distributed buffering mode, the computing device 750 is configured to (i) generate playback timing for individual frames of the audio data, where the playback timing comprises, for an individual frame of audio data, an indication of a corresponding future time that is within a second duration of time from a current clock time of the computing device 750, where the second duration of time is greater than the first duration of time (used while operating in the low latency mode), and where the future time for the individual frame specifies a time at which the playback device(s) 760 are to play the individual frame of audio data in lip-synchrony with playback of the video data associated with the audio data by the display device 702, and (ii) transmit the playback timing and the audio data to the playback device(s) 760 for playback according to the playback timing. In some embodiments, the computing device 750 may additionally transmit clock timing information to the playback device(s) 760 while operating in the distributed buffering mode. In operation, the second duration of time is longer than the first duration of time, e.g., on the order of between about 50 milliseconds to 30 seconds in some embodiments.

In operation, the computing device 750 is configured to operate in the distributed buffering mode in scenarios where the computing device 750 (*i*) receives A/V content, (ii) transmits the video data of the A/V content to the display device 702 via link 732 for playback, and (iii) transmits the audio data of the A/V content to the playback device(s) 760 for playback.

In such scenarios, the computing device 750 is able to transmit the audio data of the A/V content to the playback device(s) 760 for playback very quickly after receipt of the A/V content while buffering the video data of the A/V content for up to a few seconds (and perhaps longer) before transmitting the video data to the display device 702 for playback in lip synchrony with the playback of the corresponding audio data by the playback device(s) 760.

The playback device(s) 760 are, in turn, able to buffer the audio data for several seconds (and perhaps longer) before playing back the audio data. This approach enables all of the playback device(s) 760 in a wireless home theater configuration to receive and process received audio data in sufficient time before having to play the audio data in lip synchrony with playback of the corresponding video data by the display device 702. This additional buffering time accommodates wireless home theater configurations with many more satellite playback devices 760 compared to some existing wireless home theater configurations, e.g., up to 10, 15, 20 or even more separate wireless satellite speakers.

For example, in some embodiments, the computing device 750 is configured to operate in the distributed buffering mode when the computing device 750 receives A/V content from Internet-accessible content sources 770.

Whether operating in the low latency or distributed buffering mode, the computing device 750 is configured to generate playback timing according to any of the playback timing generation methods described herein. Additionally, whether in the low latency or distributed buffering modes, the playback device(s) 760 are configured to use the clock timing, audio data, and playback timing to play the audio data in lip synchrony with playback of the video data of the A/V content by the display device 702. In embodiments where the computing device 750 is or at least comprises a playback device, the computing device 750 may additionally play the audio data according to the playback timing. The playback device(s) 760, individually or in combination with the computing device 750, are configured to play audio data based on clock timing and playback timing according to any of the playback methods disclosed and described herein.

In some embodiments, the first duration of time (in the low latency mode) is coextensive with at least a portion of the second duration of time (in the distributed buffering mode). For example, at initial startup of playback while in the distributed buffering mode, the future time (in the playback timing) may only be a few milliseconds ahead of the current clock time of the computing device 750. But as playback continues, the future time (in the playback timing) may grow to several seconds (e.g., ~15-30 seconds) ahead of the current clock time of the computing device 750 as the computing device 750 (*i*) receives the A/V content, (ii) generates playback timing and transmits the audio data and playback timing to the playback device(s) 760 reasonably quickly after receipt so that the playback device(s) 760 can buffer each frame of audio data until the playback time for that frame, and (iii) buffers the video data of the A/V content before transmitting the video data to the display device 702 for playback. This approach works best when the computing device 750 receives the A/V content at a data rate (i.e., a receive rate) that is faster than the playback rate, thereby enabling the computing device 750 to buffer several seconds (and perhaps up to several minutes) of video data while transmitting the video data to the display device 702 for playback.

For example, in some embodiments, the first duration of time (used with the low latency mode) is between 5 milliseconds and 100 milliseconds, and the second duration of time (used with the distributed buffering mode) is between 50 milliseconds and 30 seconds. The second duration of time may be 50 milliseconds at initial startup of playback but may grow to 30 seconds (or perhaps more) during playback, depending on how much faster the computing device 750 receives the A/V content from the content service 770 as compared to the playback rate of the A/V content.

In some embodiments, the computing device 750 is additionally configured to switch between the low latency mode and the distributed buffering mode based on whether the computing device 750 is either (i) providing video data to the display device 702, and thus able to control when the display device 702 plays the video data (or at least control when the video data is provided to the display device 702 for playback) or (ii) receiving audio data from the display device 702, and thus required to process and distribute the audio data to the playback device(s) 760 as quickly as possible so that the audio data can be played in lip synchrony with playback of the corresponding video data by the display device 702.

For example, in some embodiments, while operating in the low latency mode, the computing device 750 is configured switch from operating in the low latency mode to operating in the distributed buffering mode after determining that the computing device 750 is receiving a stream of A/V content from a content service 770 via the Internet such that the computing device 750 is able to build up a buffer video data of the A/V content while transmitting the video data to the display device 702 for playback and transmit audio data corresponding to the video data to the playback device(s) 760 a few seconds (or even a few minutes) in advance of when the audio data will need to be played in lip synchrony with the video data.

Similarly, in some embodiments, while operating in the distributed buffering mode, the computing device 750 is configured to switch from operating in the distributed buffering mode to operating in the low latency mode after determining that the computing device 750 is receiving audio data of the A/V content from the display device 702. Switching to operation in the low latency mode causes the computing device 750 to transmit the audio data to the playback device(s) 760 with playback timing that causes the playback device(s) 760 to play the audio data as quickly possible to maintain lip synchrony with playback of the corresponding video by the display device 702 as compared to the distributed buffering mode. In some embodiments, the computing device 750 is configured to determine that it should switch from operating in the distributed buffering mode to operating in the low latency mode based on (i) receiving audio data from the display device 702 via the HDMI ARC link 732 between the display device 702 and the computing device 750 or (ii) receiving a Consumer Electronics Control (CEC) command from the display device 702 via link 732, where the command indicates that computing device 750 should switch to playing audio data that the display device 702 is transmitting via link 732.

Figure 7B:
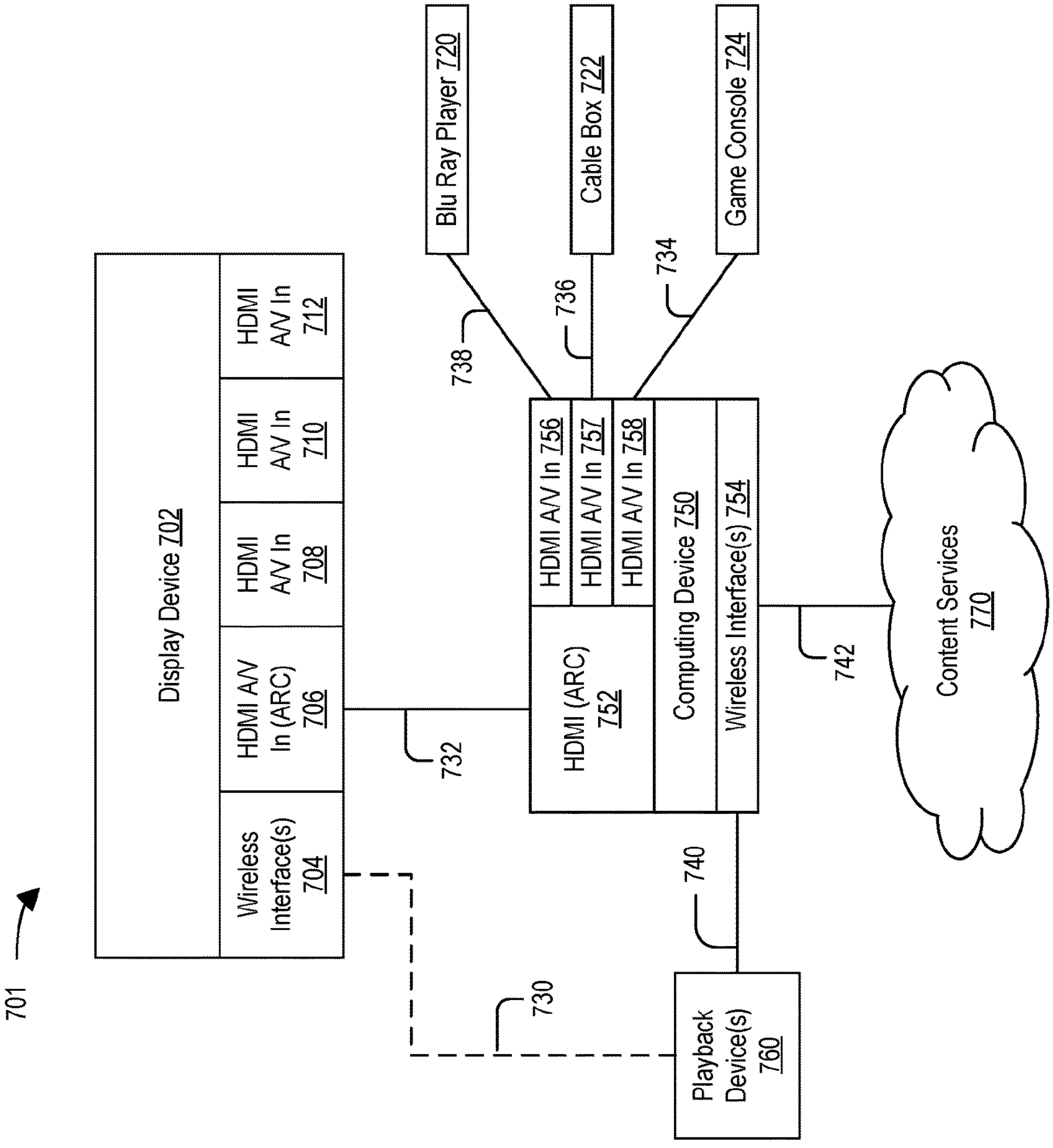
FIG. 7B shows an example system configured for wireless streaming of audio/visual content according to some embodiments.

FIG. 7B shows an example system 701 configured for wireless streaming of audio/visual content according to some embodiments.

FIG. 7B is substantially similar to FIG. 7A except that rather than Blu Ray player 720, cable box 722, and game console 724 connecting to display device 702 as in system 700 of FIG. 7A, Blu Ray player 720, cable box 722, and game console 724 in system 701 of FIG. 7B instead connect directly to computing device 750. In particular, Blu Ray player 720 is connected to HDMI A/V input 756 via link 738, cable box 722 is connected to HDMI A/V input 757 via link 736, and game console 724 is connected to HDMI A/V input 758 via link 734. The communication links shown between the devices in system 701 may be wired or wireless communications links.

In configuration 701, computing device 750 is configured to operate in the low latency mode in the same manner as described above when the computing device 750 is receiving audio data from the display device 702 via the HDMI ARC link 732. Such a scenario may occur when the display device 702 is sourcing A/V content directly from Internet-accessible content sources 770 via wireless interface(s) 704 rather than from the content sources 770 via the computing device 750. In configuration 701, the computing device 750 is also configured to operate in the low latency mode in the same manner described above when the computing device 750 is sourcing A/V content from the game console 724 and/or from the cable box 722 (at least when the A/V content from the cable box 722 is a live broadcast).

The computing device 750 in configuration 701 is configured to operate in the distributed buffering mode in the same manner described above when the computing device 750 is sourcing A/V content from an Internet-accessible content service 770, the Blu Ray player 720, and the cable box 722 (at least when the A/V content from the cable box 722 is on-demand content).

In some of embodiments of configurations 700 and 701, the display device 702 (rather than the computing device 750) may alternatively distribute audio data to the playback device(s) 760 via a wireless transmission (e.g., WiFi, Bluetooth, or other suitable wireless protocol) over communications link 730.

For example, in configuration 700 (FIG. 7A), when the display device 702 receives A/V content from any of the Blu Ray player 720, the cable box 722, game console 724, or from content services 770 (directly rather than via computing device 750), the display device 702 may transmit the audio data to the playback device(s) 760 via wireless interface(s) 704. Similarly, in configuration 701 (FIG. 7B), when the display device 702 receives A/V content from content services 770 directly rather than via computing device 750, the display device 702 may transmit the audio data to the playback device(s) 760 via wireless interface(s) 704.

In such configurations, the display device 702 may also transmit the audio data to the computing device 750 via the HDMI ARC link 752 so that the computing device 750 can also play the audio data, at least in scenarios where the computing device 750 is or at least comprises a playback device configured to play the audio data in synchrony with the other playback device(s) 760.

In some alternative embodiments where the display device 702 transmits the audio data to the playback device(s) 760 via wireless interface(s) 704, the playback device(s) are additionally configured to switch between operating in either an immediate playback mode or a playback timing mode based at least in part on whether the playback device(s) 760 are receiving audio data from (i) the display device 702 or (ii) the computing device 750.

For example, while operating in the playback timing mode, the playback device(s) 760 is/are configured to (i) receive a stream of frames comprising audio data and playback timing for the audio data from the computing device 750, where the playback timing for an individual frame of audio data corresponds to a time at which the playback device(s) 760 is/are to play the audio data of the individual frame in lip-synchrony with video data associated with the audio data, (ii) buffer the frames of audio data (and playback timing) received from the computing device 750, and (iii) play individual frames of audio data in lip-synchrony with playback of the associated video by the display device 702 according to each frame's playback timing received from the computing device 750.

And while operating in the immediate playback mode, the playback device(s) 760 is/are configured to (i) receive a stream of frames comprising audio data from the display device 702, where the audio data is associated with video data played by the display device 702, and (ii) play the audio data upon receipt from the display device 702 in lip-synchrony with playback of the associated video by the display device 702. In some embodiments, playing the audio data upon receipt form the display device 702 comprises the playback device(s) 760 playing frames of audio data as quickly as possible after receipt and without reference to playback timing. In operation, playing the audio data upon receipt may include some nominal buffering of the audio data to facilitate formation of audio samples for playback and general management of the audio data flow. But in immediate playback mode, the playback device(s) 760 play the audio as quickly as reasonably possible after receipt.

In some embodiments, while operating in the playback timing mode, the playback device(s) 760 is/are configured to switch from operating in the playback timing mode to operating in the immediate playback mode after detecting a first event corresponding to the playback device(s) 760 receiving audio data from the display device 702. For example, in some embodiments, the first event comprises the playback device(s) 760 receiving a command to switch from operating in the playback timing mode to operating in the immediate playback mode. In some embodiments, the first event comprises the playback device(s) 760 detecting receipt of at least a portion of a stream of frames comprising audio data from the display device 702 via the wireless link 730 between the display device 702 and the playback device(s) 760.

In some embodiments, when a playback device 760 switches from operating in the playback timing mode to operating in the immediate playback mode, the playback device 760 additionally flushes the audio data buffered at the playback device that was received from the computing device 750 while the playback device 760 was operating in the playback timing mode.

Figure 8:
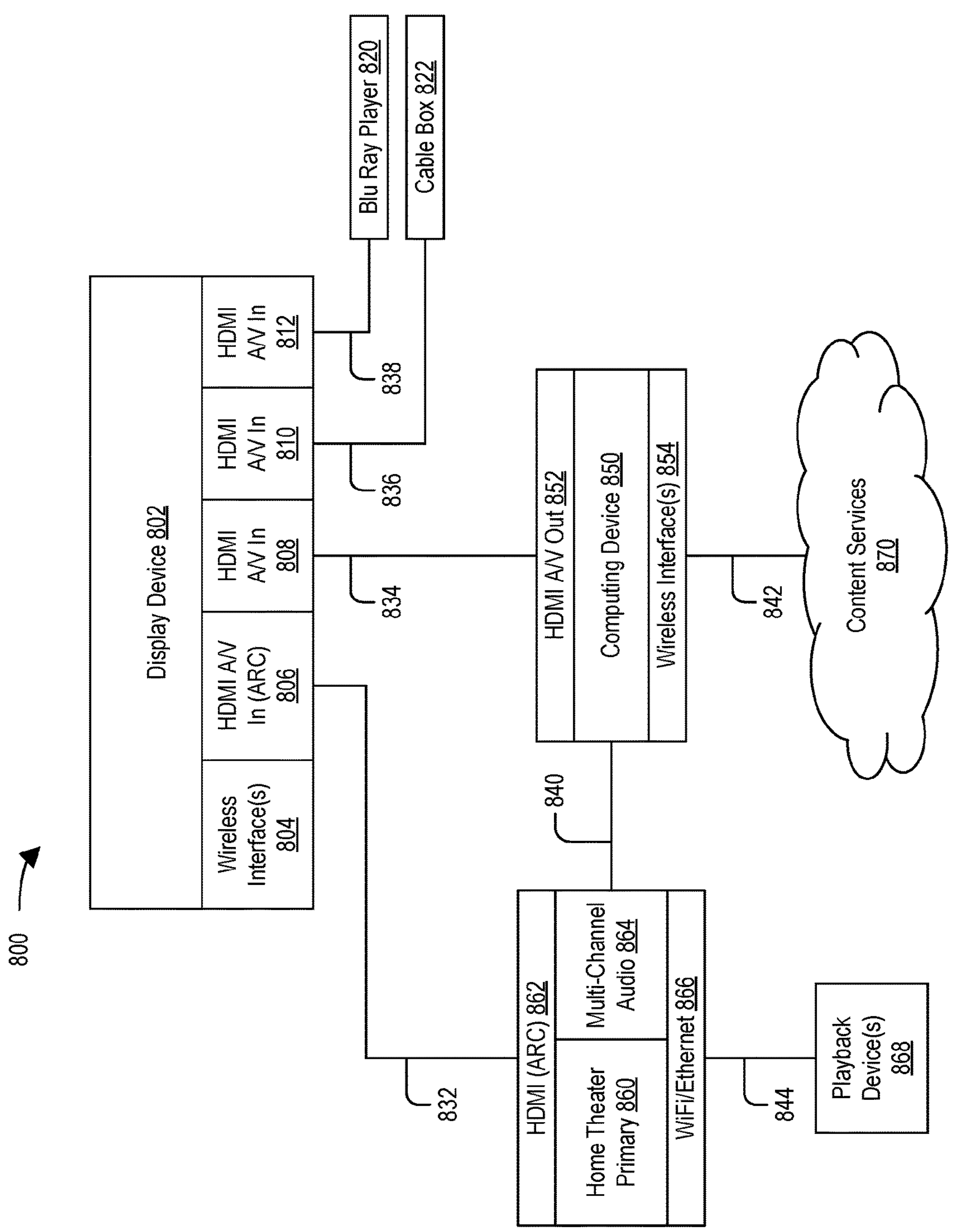
FIG. 8 shows an example system configured for wireless streaming of audio/visual content according to some embodiments.

FIG. 8 shows an example system 800 configured for wireless streaming of audio/visual content according to some embodiments.

System 800 includes display device 802, computing device 850, Blu Ray player 820, cable box 822, playback device(s) 868, and home theater primary 860. Display device 802, Blu Ray player 820, cable box 822, and playback device(s) 868 in system 800 are the same or similar to display device 702, Blu Ray player 720, cable box 722, and playback device(s) 760 in systems 700 and 701 (FIGS. 7A-B). Home theater primary 860 is a component not shown in systems 700 and 701. Computing device 850 performs many of the same functions as computing device 750 (FIGS. 7A-B) but also some different functions as described below. The communication links shown between the devices in system 800 may be wired or wireless communications links.

Home theater primary 860 comprises HDMI (ARC) interface 862, multi-channel audio interface 864, and wireless interface(s) 866. In operation, home theater primary 860 is a playback device that includes one or more speakers, such as a home theater soundbar or other playback device. In some embodiments, home theater primary 860 is the same as or similar to any of the playback devices disclosed and described herein. In some embodiments, the home theater primary 860 comprises one or more processors and tangible, non-transitory computer-readable media with instructions stored in the computer-readable media, where the instructions, when executed by the one or more processors, cause the home theater primary 860 to perform one or more of the features and/or functions disclosed and described herein.

In some embodiments, home theater primary 860 is configured to perform one or more (or all) functions of a group coordinator for a group of playback devices, such as playback device(s) 868, e.g., by performing any one or more (or all) of the group coordinator functions disclosed and described herein, including but not limited to (i) generating clock timing, (ii) sourcing audio data, (iii) generating playback timing for audio data, (iv) distributing clock timing, audio data, and playback timing to playback devices in a playback group, and/or (v) playing audio data in synchrony with playback devices in the playback group, including playing the audio data in lip-synchrony with display of corresponding video data by the display device 802.

The playback device(s) 868 may be the same as or similar to any of the playback devices disclosed and described herein. In operation, the playback device(s) 868 are configured to play audio based on (i) clock timing received from a reference clock, (ii) audio data, and (iii) playback timing for the audio data.

In some embodiments, the home theater primary 860 is configured to operate in one of at least two media distribution modes: (1) a low latency mode and (2) a distributed buffering mode. In operation, the home theater primary 860 operates in the low latency and distributed buffering modes in the substantially the same manner as computing device 750 (FIGS. 7A-B).

While operating in the low latency mode, the home theater primary 860 is configured to (i) generate playback timing for individual frames of the audio data, where the playback timing comprises, for an individual frame of audio data, an indication of a corresponding future time that is within a first duration of time from a current clock time of the home theater primary 860, and where the future time for the individual frame specifies a time at which the playback device(s) 868 are to play the individual frame of audio data in lip-synchrony with the video data associated with the audio data, and (ii) transmit the playback timing and the audio data to the playback device(s) 868 for playback according to the playback timing. In some embodiments, the home theater primary 860 may additionally transmit clock timing information to the playback device(s) 868 while operating in the low latency mode.

In operation, the home theater primary 860 is configured to operate in the low latency mode in scenarios where the home theater primary 860 receives audio data from the display device 802 via the HDMI ARC connection 832. For example, in some embodiments, the home theater primary 860 receives audio data from the display device 802 via the HDMI ARC connection 832 (and thus operates in the low latency mode) when the display device 802 sources the A/V content from any of (i) the Blu Ray player 820, (ii) the cable box 822, (iii) a game console (not shown), or (iv) the content service 870 in scenarios where the display device 802 receives the A/V content via wireless interface(s) 804 and then provides the audio data of the A/V content to the home theater primary 860 via the HDMI ARC link 832.

In the low latency mode, the home theater primary 860 must process the audio data received from the display device 802 at HDMI (ARC) interface 862 via link 832 and distribute the processed audio data to the playback device(s) 868 via link 844 fast enough so that the playback device(s) 868 have time to receive, process, and play the audio data in lip-synchrony with the corresponding video data played by the display device 802. In operation, home theater primary 860 also plays the audio data in synchrony with the playback device(s) 868 and in lip-synchrony with playback of the corresponding video data by the display device 802.

While operating in the distributed buffering mode, the home theater primary 860 is configured to (i) generate playback timing for individual frames of the audio data, where the playback timing comprises, for an individual frame of audio data, an indication of a corresponding future time that is within a second duration of time from a current clock time of the home theater primary 860, where the second duration of time is greater than the first duration of time (used while operating in the low latency mode), and where the future time for the individual frame specifies a time at which the playback device(s) 868 is/are to play the individual frame of audio data in lip-synchrony with the video data associated with the audio data, and (ii) transmit the playback timing and the audio data to the playback device(s) 868 for playback according to the playback timing. In some embodiments, the home theater primary 860 may additionally transmit clock timing information to the playback device(s) 868 while operating in the distributed buffering mode.

In operation, the home theater primary 860 is configured to operate in the distributed buffering mode in scenarios where the computing device 850 (*i*) receives A/V content (from the content services 870 or from another A/V content source), (ii) transmits the video data of the A/V content to the display device 802 via link 834 for playback, and (iii) transmits the audio data of the A/V content to the home theater primary 860 via link 840 for distribution to and playback in synchrony by the playback device(s) 868. In this scenario, the home theater primary 860 receives the audio data from the computing device 850, generates playback timing for the audio data, and transmits the audio data and playback timing for the audio data to the playback device(s) 868 for playback in lip synchrony with playback of the corresponding video data by the display device 802.

In operation, the home theater primary 860 is able to transmit the audio data of the A/V content to the playback device(s) 868 for playback very quickly after receipt of the audio data from the computing device 850 while the computing device 850 buffers the a few seconds (or up to a few minutes) of video data of the A/V content while transmitting the video data to the display device 802 for playback in lip synchrony with playback of the corresponding audio data by the playback device(s) 868 and the home theater primary 860.

The playback device(s) 868 are, in turn, able to buffer the audio data for several seconds (or even several minutes) before playing back the audio data according to the playback timing received from the home theater primary 860. This approach enables the home theater primary 860 and all of the playback device(s) 868 in configuration 800 to receive and process received audio data in sufficient time before having to play the audio data in lip synchrony with playback of the corresponding video data by the display device 802.

For example, in some embodiments, the home theater primary 860 is configured to operate in the distributed buffering mode when the computing device 850 receives A/V content from Internet-accessible content sources 870.

Whether operating in the low latency or distributed buffering mode, the home theater primary 860 is configured to generate playback timing according to any of the playback timing generation methods described herein. Additionally, whether in the low latency or distributed buffering modes, the playback device(s) 868 are configured to use the clock timing, audio data, and playback timing to play the audio data in lip synchrony with playback of the video data of the A/V content by the display device 802. The home theater primary 860 additionally plays the audio data according to the playback timing. The playback device(s) 868, individually or in combination with the home theater primary 860, are configured to play audio data based on clock timing and playback timing according to any of the playback methods disclosed and described herein.

In some embodiments, the computing device 850 additionally generates playback timing for the video data, where the playback timing for an individual frame of video indicates a time (relative to the clock time of the computing device 850 or perhaps the home theater primary 860) at which the display device 802 is to play the frame of video data. The computing device 850 also transmits the video data and the playback timing for the video data to the display device 802. In some embodiments, the computing device 850 (or perhaps the home theater primary 860) also provides clock timing information to the display device 802. The display device 802 in some embodiments also uses the clock timing and the playback timing for the video data to play the video data in lip synchrony with playback of the audio data by the home theater primary 860 and the playback devices 868 in a manner similar to how individual playback devices use clock timing information and playback timing for audio data to play audio data in synchrony with each other, as described herein. However, the display device 802 can instead play the video data upon receipt rather than using clock timing and playback timing to play the video data.

In some embodiments, the first duration of time (in the low latency mode) is coextensive with at least a portion of the second duration of time (in the distributed buffering mode). For example, at initial startup of playback while in the distributed buffering mode, the future time (in the playback timing) may only be a few milliseconds ahead of the current clock time of the home theater primary 860. But as playback continues, the future time (in the playback timing) may grow to several seconds (e.g., ~15-30 seconds, or even a few minutes) ahead of the current clock time of the home theater primary 860 as the home theater primary 860 (*i*) receives the audio data from the computing device 850 via link 840, (ii) generates playback timing and transmits the audio data and playback timing to the playback device(s) 868 reasonably quickly after receipt so that the playback device(s) 868 can buffer the audio data until playing each frame of audio at the frame's playback time. This approach works best when the computing device 850 receives the A/V content at a data rate that is faster than the playback rate (by the display device 802, home theater primary 860 and playback device(s) 868), thereby enabling the computing device 850 to buffer several seconds (or maybe even several minutes) of video data while transmitting the video data to the display device 802 for playback.

For example, in some embodiments, the first duration of time (used with the low latency mode) is between 5 milliseconds and 100 milliseconds, and the second duration of time (used with the distributed buffering mode) is between 50 milliseconds and 30 seconds. The second duration of time may be 50 milliseconds at initial startup of playback but may grow to 30 seconds (or perhaps more) during playback, depending on how much faster the computing device 850 receives the A/V content from the content service 870 as compared to the playback rate of the A/V content.

In some embodiments, the home theater primary 860 is additionally configured to switch between operating in the low latency mode and operating in the distributed buffering mode based on whether (i) the computing device 850 is providing video data to the display device 802 and audio data to the home theater primary 860, thereby enabling the computing device 850 to control when the display device 802 plays the video data (or at least control when the video data is provided to the display device 802 for playback) or (ii) the home theater primary 860 is receiving audio data from the display device 802, and thus is required to process and distribute the audio data to the playback device(s) 868 as quickly as possible so that the audio data is played in lip synchrony with playback of the corresponding video data by the display device 802.

For example, in some embodiments, while operating in the low latency mode, the home theater primary 860 is configured switch from operating in the low latency mode to operating in the distributed buffering mode after determining that the home theater primary 860 is receiving audio data from the computing device 850 via link 840.

Similarly, in some embodiments, while operating in the distributed buffering mode, the home theater primary 860 is configured to switch from operating in the distributed buffering mode to operating in the low latency mode after determining that the home theater primary 860 is receiving audio data from the display device 802 via the HDMI ARC link 832. Switching to operation in the low latency mode causes the home theater primary 860 to transmit the audio data to the playback device(s) 868 with playback timing that causes the playback device(s) 868 to play the audio data as quickly possible to maintain lip synchrony with playback of the corresponding video by the display device 802 as compared to the distributed buffering mode.

In some embodiments, the home theater primary 860 is configured to determine that it should switch from operating in the distributed buffering mode to operating in the low latency mode based on (i) receiving audio data from the display device 802 via the HDMI ARC link 832 between the display device 802 and the home theater primary 860 or (ii) receiving a Consumer Electronics Control (CEC) command from the display device 802 via link 832 that instructs the home theater primary 860 to play audio data that the display device 802 is transmitting via link 832.

Figure 9:
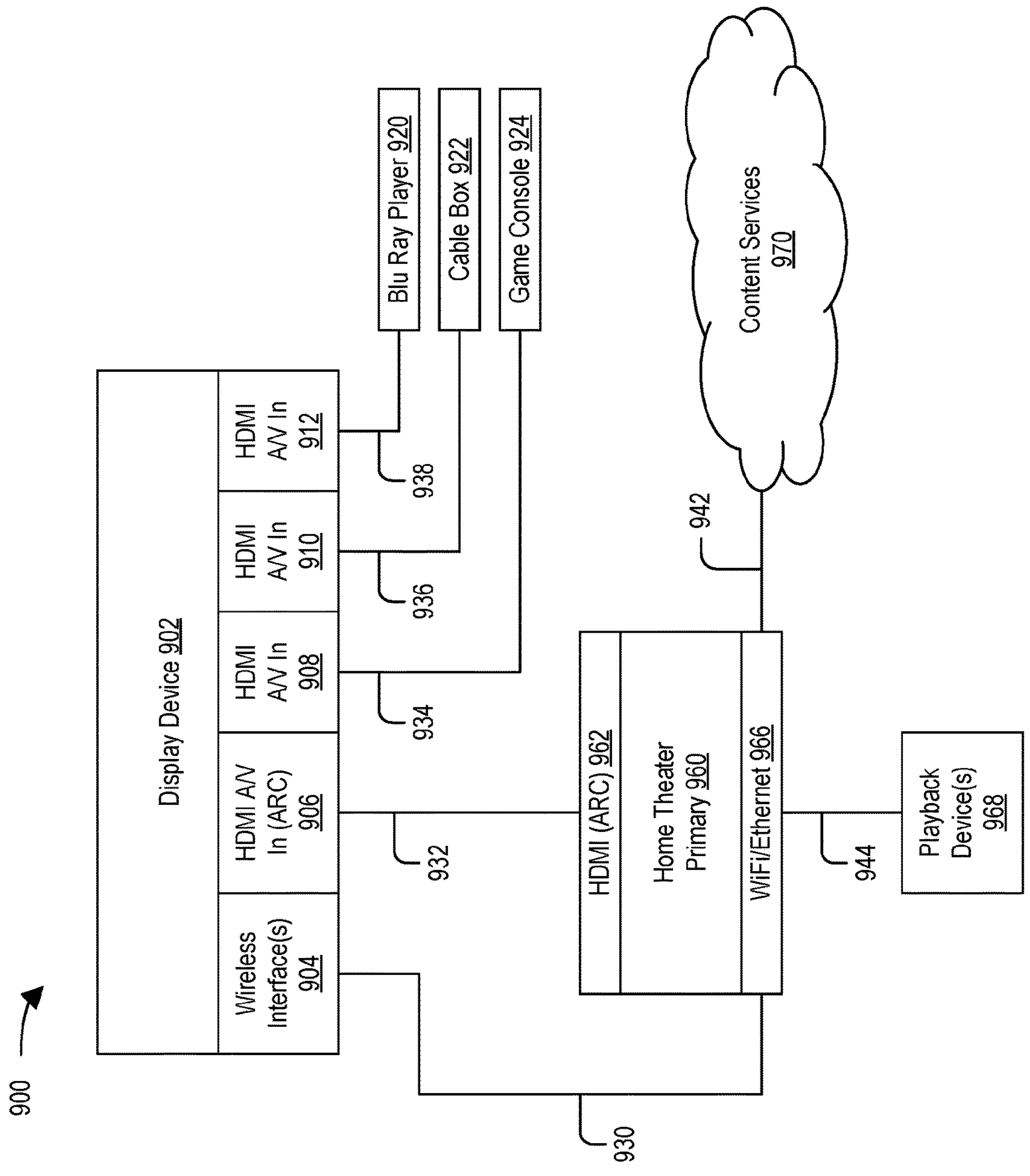
FIG. 9 shows an example system configured for wireless streaming of audio/visual content according to some embodiments.

FIG. 9 shows an example system 900 configured for wireless streaming of audio/visual content according to some embodiments.

System 900 includes display device 902, Blu Ray player 920, cable box 922, game console 924, playback device(s) 968, and home theater primary 960. Display device 902, Blu Ray player 920, cable box 922, game console 924, and playback device(s) 968 in system 900 are the same or substantially the same as display device 702, Blu Ray player 720, cable box 722, and playback device(s) 760 in systems 700 and 701 (FIGS. 7A-B). Home theater primary 960 is configured to perform at least some features of home theater primary 860 and computing devices 750 and 850 in FIGS. 7A-B and 8 as described herein. The communication links shown between the devices in system 900 may be wired or wireless communications links.

Home theater primary 960 comprises HDMI (ARC) interface 962 and wireless interface(s) 966. In operation, home theater primary 960 is a playback device that includes one or more speakers, such as a home theater soundbar or other playback device. In some embodiments, home theater primary 960 is the same as or similar to any of the playback devices disclosed and described herein. In some embodiments, the home theater primary 960 comprises one or more processors and tangible, non-transitory computer-readable media with instructions stored in the computer-readable media, where the instructions, when executed by the one or more processors, cause the home theater primary 960 to perform one or more of the features and/or functions disclosed and described herein.

In some embodiments, home theater primary 960 is configured to perform one or more (or all) functions of a group coordinator for a group of playback devices, such as playback device(s) 968, e.g., by performing any one or more (or all) of the group coordinator functions disclosed and described herein, including but not limited to (i) generating clock timing, (ii) sourcing audio data, (iii) generating playback timing for audio data, (iv) distributing clock timing, audio data, and playback timing to playback devices in a playback group, and/or (v) playing audio data in synchrony with playback devices in the playback group, including playing the audio data in lip-synchrony with display of corresponding video data by the display device 902.

The playback device(s) 968 may be the same as or similar to any of the playback devices disclosed and described herein. In operation, the playback device(s) 968 are configured to play audio based on (i) clock timing received from a reference clock, (ii) audio data, and (iii) playback timing for the audio data.

In some embodiments, the home theater primary 960 is configured to operate in one of at least two media distribution modes: (1) a low latency mode and (2) a distributed buffering mode. In operation, the home theater primary 960 operates in the low latency and distributed buffering modes in the substantially the same manner as computing device 750 (FIGS. 7A-B).

While operating in the low latency mode, the home theater primary 960 is configured to (i) generate playback timing for individual frames of the audio data, where the playback timing comprises, for an individual frame of audio data, an indication of a corresponding future time that is within a first duration of time from a current clock time of the home theater primary 960, and where the future time for the individual frame specifies a time at which the playback device(s) 960 is/are to play the individual frame of audio data in lip-synchrony with the video data associated with the audio data, and (ii) transmit the playback timing and the audio data to the playback device(s) 968 for playback according to the playback timing. In some embodiments, the home theater primary 960 may additionally transmit clock timing information to the playback device(s) 968 while operating in the low latency mode.

In operation, the home theater primary 960 is configured to operate in the low latency mode in scenarios where the home theater primary 860 receives audio data from the display device 902 via the HDMI ARC connection 932. For example, in some embodiments, the home theater primary 960 receives audio data from the display device 902 via the HDMI ARC connection 932 (and thus operates in the low latency mode) when the A/V content is sourced from any of (i) the Blu Ray player 920, (ii) the cable box 922, (iii) the game console 924, or (iv) the content service 970 in scenarios where the display device 902 receives the A/V content via wireless interface(s) 904 and then provides the audio data of the A/V content to the home theater primary 960 via the HDMI ARC link 932.

In the low latency mode, the home theater primary 960 must process the audio data received from the display device 902 at HDMI (ARC) interface 962 via link 932 and distribute the processed audio data to the playback device(s) 968 via link 944 fast enough so that the playback device(s) 968 have time to receive, process, and play the audio data in lip-synchrony with the corresponding video data played by the display device 902. In operation, home theater primary 960 also plays the audio data in synchrony with the playback device(s) 968 and in lip-synchrony with playback of the corresponding video data by the display device 902.

While operating in the distributed buffering mode, the home theater primary 960 is configured to (i) generate playback timing for individual frames of the audio data, where the playback timing comprises, for an individual frame of audio data, an indication of a corresponding future time that is within a second duration of time from a current clock time of the home theater primary 960, where the second duration of time is greater than the first duration of time (used while operating in the low latency mode), and wherein the future time for the individual frame specifies a time at which the playback device(s) 968 is/are to play the individual frame of audio data in lip-synchrony with the video data associated with the audio data, and (ii) transmit the playback timing and the audio data to the playback device(s) 968 for playback according to the playback timing. In some embodiments, the home theater primary 960 may additionally transmit clock timing information to the playback device(s) 968 while operating in the distributed buffering mode.

In operation, the home theater primary 960 is configured to operate in the distributed buffering mode in scenarios where the home theater primary 960 (*i*) receives A/V content (from the content services 970 or from another A/V content source), (ii) transmits the video data of the A/V content to the display device 902 via link 834 for playback, and (iii) transmits the audio data of the A/V content to the playback device(s) 968 via link 944 for playback. In this scenario, while receiving the A/V content, the home theater primary 960, generates playback timing for the audio data, and transmits the audio data and playback timing for the audio data to the playback device(s) 868 for playback in lip synchrony with playback of the corresponding video data by the display device 902.

In operation, the home theater primary 960 is able to transmit the audio data of the A/V content to the playback device(s) 968 for playback very quickly after receipt while the home theater primary 960 builds up a buffer of a few seconds (or perhaps a few minutes) of video data while transmitting the video data to the display device 902 for playback in lip synchrony with playback of the corresponding audio data by the playback device(s) 968 and the home theater primary 960. The home theater primary 960 is able to buffer a few seconds (or a few minutes) of video while transmitting the video data to the display device 902 for playback when the receipt rate of the A/V content from the content source is faster than the playback rate of the A/V content by the display device 902, home theater primary 960, and playback device(s) 968.

The playback device(s) 968 are, in turn, able to buffer several seconds (or several minutes) of audio data while playing back individual frames of audio data according to each frame's playback timing received from the home theater primary 960. This approach enables the home theater primary 960 and all of the playback device(s) 968 in configuration 900 to receive and process received audio data in sufficient time before having to play the audio data in lip synchrony with playback of the corresponding video data by the display device 902.

For example, in some embodiments, the home theater primary 960 is configured to operate in the distributed buffering mode when the home theater primary 960 receives A/V content from Internet-accessible content sources 870.

Whether operating in the low latency or distributed buffering mode, the home theater primary 960 is configured to generate playback timing according to any of the playback timing generation methods described herein. Additionally, whether the home theater primary 960 is operating in the low latency or distributed buffering modes, the playback device (s) 968 are configured to use the clock timing, audio data, and playback timing to play the audio data in lip synchrony with playback of the video data of the A/V content by the display device 902. The home theater primary 960 additionally plays the audio data according to the playback timing. The playback device(s) 968, individually or in combination with the home theater primary 960, are configured to play audio data based on clock timing and playback timing according to any of the playback methods disclosed and described herein.

In some embodiments, the home theater primary 960 additionally generates playback timing for the video data, where the playback timing for an individual frame of video indicates a time (relative to the clock time of the home theater primary 960) at which the display device 902 is to play the frame of video data. The home theater primary 960 also transmits the video data and the playback timing for the video data to the display device 902. In some embodiments, the home theater primary 960 also provides clock timing information to the display device 902. The display device 902 in some embodiments also uses the clock timing and the playback timing for the video data to play the video data in lip synchrony with playback of the audio data by the home theater primary 960 and the playback devices 968 in a manner similar to how individual playback devices use clock timing information and playback timing for audio data to play audio data in synchrony with each other, as described herein. However, the display device 902 can instead play the video data upon receipt rather than using clock timing and playback timing to play the video data, with the home theater primary 960 controlling when to provide individual frames of video to the display device 902.

In some embodiments, the first duration of time (in the low latency mode) is coextensive with at least a portion of the second duration of time (in the distributed buffering mode). For example, at initial startup of playback while in the distributed buffering mode, the future time (in the playback timing) may only be a few milliseconds ahead of the current clock time of the home theater primary 960. But as playback continues, the future time (in the playback timing) may grow to several seconds (e.g., ~15-30 seconds or even a few minutes) ahead of the current clock time of the home theater primary 960 as the home theater primary 960 (*i*) receives the audio data. (ii) generates playback timing and transmits the audio data and playback timing to the playback device(s) 968 reasonably quickly after receipt so that the playback device(s) 968 can buffer the audio data until playing each frame of audio at its playback time. As mentioned earlier, this approach works best when the home theater primary 960 receives the A/V content at a data rate that is faster than the playback rate (by the display device 902, home theater primary 960 and playback device(s) 968), thereby enabling the home theater primary 960 to buffer several seconds (or maybe even several minutes) of video data before transmitting the video data to the display device 902 for playback.

For example, in some embodiments, the first duration of time (used with the low latency mode) is between 5 milliseconds and 100 milliseconds, and the second duration of time (used with the distributed buffering mode) is between 50 milliseconds and 30 seconds. The second duration of time may be 50 milliseconds at initial startup of playback but may grow to 30 seconds (or perhaps more) during playback, depending on how much faster the home theater primary 960 receives the A/V content from the content service 970 as compared to the playback rate of the A/V content.

In some embodiments, the home theater primary 960 is additionally configured to switch between operating in the low latency mode and operating in the distributed buffering mode based on whether (i) the home theater primary 960 is providing video data to the display device 902 and audio data to the playback device(s) 968, thereby enabling the home theater primary 960 to control when the display device 902 plays the video data (or at least control when the video data is provided to the display device 902 for playback) or (ii) the home theater primary 960 is receiving audio data from the display device 902, and thus is required to process and distribute the audio data to the playback device(s) 968 as quickly as possible so that the audio data is played in lip synchrony with playback of the corresponding video data by the display device 902.

For example, in some embodiments, while operating in the low latency mode, the home theater primary 960 is configured switch from operating in the low latency mode to operating in the distributed buffering mode after determining that the home theater primary 960 is receiving A/V content from content source 970.

Similarly, in some embodiments, while operating in the distributed buffering mode, the home theater primary 860 is configured to switch from operating in the distributed buffering mode to operating in the low latency mode after determining that the home theater primary 960 is receiving audio data from the display device 902 via the HDMI ARC link 932. Switching to operation in the low latency mode causes the home theater primary 960 to transmit the audio data to the playback device(s) 968 with playback timing that causes the playback device(s) 968 to play the audio data as quickly possible to maintain lip synchrony with playback of the corresponding video by the display device 902 as compared to the distributed buffering mode.

In some embodiments, the home theater primary 960 is configured to determine that it should switch from operating in the distributed buffering mode to operating in the low latency mode based on (i) receiving audio data from the display device 902 via the HDMI ARC link 932 between the display device 902 and the home theater primary 960 or (ii) receiving a Consumer Electronics Control (CEC) command from the display device 902 via link 932.

VIII. Examples of Contextual User Interface Element Detection

In various examples, the systems and methods described above for providing audio/visual content can enable richer user interactions for home theatre applications than conventional approaches. For example, in some instances a user may utilize an additional device having another display screen (e.g., a smartphone or tablet with a built-in display) in conjunction with a primary display device such as a television. As described in more detail below, a multitude of user interactions are enabled by this architecture.

Figure 10:
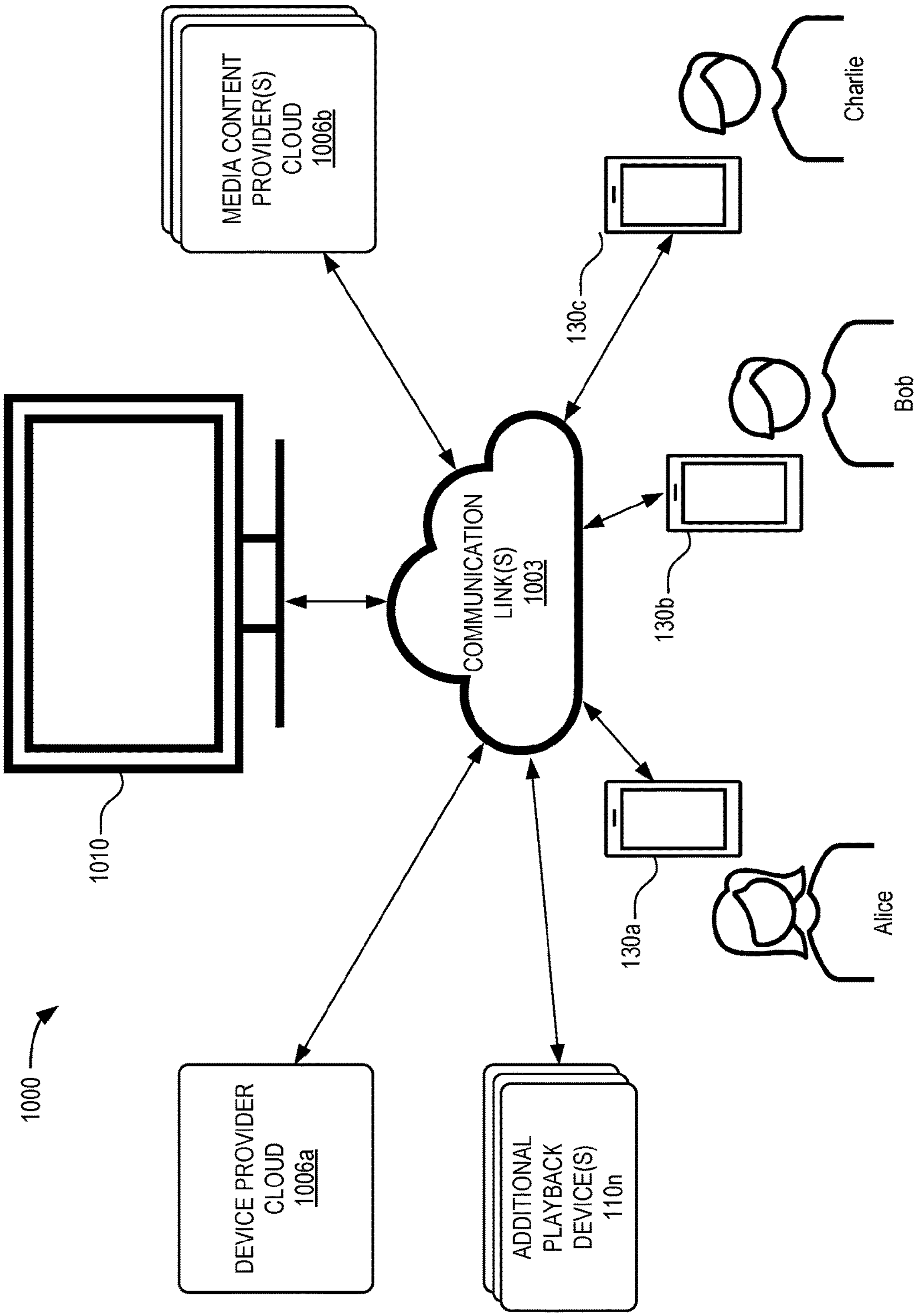
FIG. 10 is a schematic view of a media playback system for multi-display user interactions according to some embodiments.

FIG. 10 is a schematic view of a media playback system 1000 for multi-display user interactions in accordance with examples of the disclosed technology. In the illustrated example, a first user, Alice, has a first controller or control device 130*a*, a second user, Bob, has a second controller or control device 130*b*, and a third user, Charlie, has a third controller or control device 130*b* (collectively "controllers 130" or "control devices 130"). The control devices 130 are communicatively coupled to a first playback device 1010 (which can include or be coupled to a display component such as a screen), one or more additional playback devices 110*n* (some or all of which may likewise be coupled to a display component such as a screen), a device provider cloud 1006*a*, and/or one or more media content provider clouds 1006*b*. The communication link(s) 1003 can include one or more wired networks, wireless networks, wide area networks, local area networks, telecommunications networks (e.g., GSM, LTE, 5G, etc.), and optionally direct wireless links such as Bluetooth®, near-field communication (NFC), or other such wireless communication links. In various examples, the components of the media playback system 1000 shown in FIG. 10 can be in communication with one another via any of the above-mentioned communication links and any combination thereof. In some examples, the control devices 130 may be coupled only to some but not all of these components. For example, the control devices 130 may be communicatively coupled to the playback device 1010, and yet not be in direct communication with the device provider cloud 1006*a* and/or the media content provider cloud 1006*b*.

In some examples, one or both of the control devices 130 can take the form of a smartphone, tablet, smart remote, smart glasses, smartwatch, home integration display, remote control, or any other device that enables the user to view a user interface (e.g., via a display component of the control device 130) and/or to provide user input (e.g., via a touchscreen, voice input, physical buttons, or other suitable input).

The playback device 1010 can include a display component (e.g., a screen, projector, etc.). In the illustrated example, the playback device 1010 takes the form of a television. In various examples, the playback device 1010 can take the form of a soundbar, dongle, set-top box, hub, or other such component that is linked to a display component (e.g., a separate and discrete display device) via a wired or wireless connection. Some or all of the additional playback devices 110*n* may optionally include a display component. In some examples, at least some of the additional playback devices 110*n* may not include a display component. Such playback devices 110*n* can be configured to play back or record audio content without also playing back visual content.

In at least some examples, the playback device 1010 can be coupled to or can include a display device such as display devices 702, 802, and/or 902 described elsewhere herein.

The device provider cloud 1006*a* can correspond to a cloud network affiliated with the playback device 1010 or manufacturer thereof. The device provider cloud 1006*a* can include features generally similar or identical to those of the cloud network 102 previously described. For example, the device provider cloud 1006*a* can include one or more computing devices, which may each have individual computers or servers with access to a media streaming server storing audio content and/or audio-visual content. In some examples, the device provider cloud 1006*a* may serve as an intermediary platform between the user and the media services or media content of a plurality of media content providers. Additionally, or alternatively, the device provider cloud 1006*a* may have a graphical user interface affiliated therewith for the playback device 1010 that can be provided to the user (e.g., via a display component of the playback device 1010 and/or via a display component of the control devices 130) and which displays the media content of the media content providers. As shown in FIG. 10, the device provider cloud 1006*a* can be communicatively coupled to each of the playback device 1010, the control devices 130, and/or the media content provider cloud 1006*b*. As such, the device provider cloud 1006*a* can stream data (e.g., accessible media content, user interfaces, etc.) to the playback device 1010, and/or to the controller 130.

The media content provider cloud 1006*b* can correspond to a cloud network affiliated with one or more media content providers, such as OTT services (e.g., Pluto TV®, Philo®, Tubi®, Xumo®, etc.), video-subscription services (e.g., Comcast®, Dish®, DirectTV®, and other cable/satellite providers), and other video content providers (e.g., Netflix®, Hulu®, Amazon Prime®, Freevee®, HBO®, etc.). In some examples, the media content provider cloud 1006*b* can include computing devices associated with a content delivery network, which serves as an intermediary between content providers (e.g., Netflix®) and a viewer. The media content provider cloud 1006*b* can include features generally similar or identical to those of the cloud network 102 previously described. For example, the media content provider cloud 1006*b* can include one or more computing devices, which may each have individual computers or servers with access to a media streaming server storing audio content, visual content, and/or audio-visual content. As shown in FIG. 10, the media content provider cloud 1006*b* can be communicatively coupled to each of the playback device 1010, the control devices 130, and the device provider cloud 1006*a*. As such, the media content provider cloud 1006*b* can stream data (e.g., accessible media content, user interfaces, signals, etc.) directly to the playback device 1010 and/or the control devices 130, or indirectly to the playback device 1010 and/or the control devices 130 via the device provider cloud 1006*a*.

In operation, Alice, Bob, and Charlie may view media content played back via the video playback device 1010 together, for example in a living room. The playback device 1010 thereby operates as a primary display. Concurrently, Alice, Bob, and Charlie can each view contextual user interfaces via their respective control devices 130*a*, 130*b*, and 130*c*. The control devices thereby each operate as secondary displays. The contextual user interfaces available to and/or presented to Alice, Bob, and Charlie can be identical or may differ in various examples. In addition to presentation of contextual user interfaces, Alice, Bob, and Charlie may control operation of the playback device 1010, for example by selecting media for playback, issuing transport commands (e.g., pause, fast-forward, etc.), or any other such operation, by interacting with their respective control devices 130. Although three users, each with a respective control device 130, are illustrated, in various examples there may be fewer or more users, and there may be fewer or more control devices.

In some examples, the control device 130 can be configured to serve as a gaming controller when gaming content is played back via the video playback device 1010. As another example, a user may use the control device 130 to adjust parental controls or other restrictions for playback on the video playback device 1010 using the control device 130. The use of a smartphone or other similar interface for such settings is far simpler than navigating a conventional television menu to achieve the same result. In these and other cases, the use of one or more secondary displays in conjunction with the primary display can offer an improved user experience across a wide range of activities.

Moreover, in some examples, the media playback system 1000 can determine a proximity of one or more of the control devices 130 with respect to the video playback device 1010. As such, when Alice leaves the room and is no longer viewing content via the video playback device 1010, the media playback system 1000 may cease presenting contextual user interfaces to Alice via her control device 130*a*. Similarly, when Alice joins Bob and Charlie mid-viewing, the media playback system 1000 may initiate presentation of a contextual user interface to Alice via her control device 130*a*. In some cases, when a user leaves or joins the media playback system 1000 can identify a primary user based on, for example, a predetermined user hierarchy, time spent watching or listening, user vote/poll, randomly, etc. Proximity determinations can be made using any suitable technique. Example techniques include identifying that the control device(s) 130 are on the same local area network as the video playback device 1010, the use of a direct wireless communication link between the control device 130 and the video playback device 1010 (e.g., Bluetooth, near-field communication (NFC), ultra-wideband (UWB) etc.), the use of a received signal strength indicator (RSSI) value, acoustic-based localization (e.g., the playback device 1010 can emit an acoustic signal such as an ultrasonic chirp which can be detected and analyzed via the control device 130*a*, or vice versa), or any other suitable technique for detecting and/or determining proximity between one or more control devices 130 and the video playback device 1010. In some examples the media playback system 1000 may perform certain actions in response to a determination of proximity (or lack thereof) between one or more control devices 130 and the video playback device 1010. Conversely, the media playback system 1000 may perform certain actions in response to a determination that one or more control devices are not in proximity to the video playback device 1010.

Systems and methods for providing a contextual controller user interface to one or more secondary devices are disclosed. In some examples, the media playback system includes at least one playback device, such as a set-top box and/or television, and at least one secondary or controller device, such as a mobile device with a touch-sensitive display. The media playback system provides a contextual controller user interface to the one or more secondary devices that allows one or more users to interact with a media data stream provided by, for example, a media content provider and presented via a display device. While receiving the media data stream, the playback device transmits the media data stream to a display device for playback and determines whether the media data stream includes any contextual display user interface elements, such as a "Skip Intro" button, a "Skip Recap" button, etc.

In some examples, the media playback system uses an accessibility service to determine whether there are any contextual display user interface elements included in the media data stream. An accessibility service is an application that enables user interface interactions and modifications to assist, for example, users with disabilities, users who are presently unable to fully interact with a device, and so on. For example, the Android Open Source Project supports allowing third-parties, such as platform vendors, to implement an accessibility service without requiring user permission requests. Through such an accessibility service, the media playback system can inspect user interface elements for various attributes, such as their size, position, color, state, focus condition, etc. Thus, the media playback system can use the accessibility service to identify, find, interrogate, and interact with user interface elements by, for example, requesting attribute values associated with the user interface elements, sending requests to set those attribute values, and so on. For example, the media playback system could determine whether a particular user interface element is focused, find a user element that the media playback system wants to be focused, request that a particular element be focused, send a "select" command when the appropriate user interface element is focused, and so on.

In some examples, the media playback system infers potential contextual display user interface elements from past interactions with one or more users. For example, the media playback system can record and/or retrieve information about when users perform particular interactions (e.g., fast forwarding, skipping ahead, rewinding, etc.) with respect to a particular piece of media content, such as an episode of a television program. The media playback system can record these interactions and store them in individual user profiles in a user profile store to track and record playback position skips, etc. If the media playback system determines that a user regularly skips (e.g., more than 3 episodes in a row, more than 60% of the time) a portion of each episode of a program (e.g., the first 30 seconds of an episode, a minute starting at the five-minute mark, 45 seconds after a particular frame is shown, etc.) through, for example, a graphical user interface, hardware remote, voice command, hardware input via a playback device, etc., the media playback system can generate and provide to a secondary device a corresponding contextual controller user interface element that allows the user to skip that portion at a predetermined period before the portion the user usually skips. As another example, if the media playback system determines that more than a predetermined threshold number (or percentage) of users have advanced the media content by, for example, an average of 45 seconds (or a corresponding number of frames) at 0:15, the media playback system can infer a "45 Second Skip" button or "Skip Intro" button and provide a corresponding contextual controller user interface element to the secondary device(s), thereby allowing a user to skip ahead 45 seconds by interacting with (e.g., selecting) the contextual controller user interface element.

Thus, the media playback system can generate and present new contextual controller user interface element(s), even though the underlying content provider's user interface does not include a corresponding user interface element(s) (or if such a user interface element has gone away), thereby enhancing the user's overall experience and interaction with the media content. By analyzing user interactions with the content, the media playback system can use timestamp information to determine when to present contextual user interface elements. For example, an OTT content provider may exclude "Skip Ahead" buttons altogether. The media playback system can enhance the user's experience with the provided content by presenting a "Skip Ahead" contextual controller user interface element when there otherwise would be one available. Moreover, the media playback system can be configured to automatically select certain contextual controller user interface elements, thereby allowing a user to have, for example, certain portions of content automatically skipped, such as all intros and recaps, all intros of a particular television program, all credits, and so on. As another example, parents may wish to have certain parts of content skipped while children are watching. The parent can mark or otherwise designate certain sensitive portions of content to be skipped automatically. Similarly, the media playback system can rely on crowdsourced designations or inferences based on historical interactions of users to identify material to be skipped. A "Skip" user interface button may be inferred based at least in part on a timestamp of the media data being played and historical information about user interactions with the media data stream, such as a log of "Skip" or "Fast Forward" interactions with the media data and the amount of time or number of frames that were skipped. In this manner, the media playback system can anticipate when a contextual controller user interface element should be presented based on a history of user interactions with a media data stream and present the contextual controller user interface element at the appropriate time.

In some examples, the media playback system determines whether there are any contextual display user interface elements included in the media data stream by analyzing or "sniffing" pixels of the media data stream. The media playback system periodically captures or "scrapes" screen pixels received as part of a media data stream and uses various techniques to identify shapes and text within the media data stream, such as edge detection techniques, object detection/recognition techniques, etc. to search for various shapes and/or objects, character recognition techniques to search for alphanumeric information (in one or more languages), and so on. For example, the media playback system may search for ◀, ◀◀, ▶▶, ▶ shapes (or combinations of shapes), etc. to identify a candidate for a potential "Skip" button, such as a "Skip Intro" button, a "Skip Commercial" button, etc. Similarly, the media playback system can use optical character recognition techniques to search the media data stream for particular text, such as "Next Episode," "Closed Captioning," "Skip Ad," and so on. In some cases, to conserve resources, such as processor resources, the media playback system limits the search for contextual display user interface elements in the media data stream to particular time segments (e.g., first 30 seconds, last two minutes, etc.), a particular portion of the media data stream, such as the bottom right quadrant of a display, a predesignated area, etc. so that every pixel does not have to be examined. The media playback system can also use edge detection techniques to identify these areas by, for example, looking for areas that correspond to button shapes, etc. and then analyzing those areas for particular text or other indications of contextual user interface elements.

In some examples, the pixel sniffing techniques employed by the media playback system rely on particular colors or color motifs. Thus, if a particular content provider, such as an OTT provider, is known to present contextual display user interface elements in a particular color or set of colors (based on, for example, RGB values, HEX color values, Pantone® values, etc.) the media playback system can use this information to identify pixels for further examination (e.g., pixels that include those colors and the surrounding areas) and/or rule out areas or candidate user interface elements that do not use those colors. The media playback system may periodically retrieve or generate updated color and/or color motif information for a content provider to ensure that the media playback system can more accurately identify contextual display user interface elements. In some cases, the media playback system trains and employs machine learning models to identify contextual display user interface elements in a media stream. The media playback system can use the user interactions with contextual user interface elements as inputs to the training process to further improve the machine learning models over time. The media playback system can rely on various processing units to perform the pixel sniffing, such as a central processing unit, a graphical processing unit, and neural processing unit, and so on.

After determining that the media data stream includes contextual display user interface elements, the media playback system causes one or more of the secondary devices to present a corresponding contextual controller user interface element. For example, the media playback system may send an indication of one or more contextual user interface elements to the one or more secondary devices, such as an indication of a selectable button, an indication of a text field and keyboard, a voice command or instruction, etc. These secondary devices may be identified as currently logged into the playback device, currently logged into a content provider account that the playback device is also logged into, communicatively coupled to the playback device, connected to the same network as the playback device, etc. In some examples, the media playback system identifies contextual user interface elements for presentation on a secondary device from among a set of one or more user interface elements (or a subset thereof) associated with the media content provider. For example, the set of one or more contextual controller user interface elements may include custom user interface elements and corresponding text retrieved from, or designed for, the media content provider, such as a "Skip Intro" button and a "Skip Episode" button that each match the look and feel (e.g., font, color, button shapes, etc.) of the display user interface of the media content provider. In this manner, contextual controller user interface elements displayed on, for example, secondary devices will match or resemble contextual display user interface elements that are displayed by the playback device. In some cases, the media playback system translates text in one language presented as part of a contextual display user interface element to another language when, for example, a user interface provided by a content provider does not support a user's preferred language(s). In some cases, the media playback system suppresses display of user interface elements unrelated to the contextual controller user interface elements to highlight the contextually relevant user interface elements to the user.

After the contextual controller user interface is presented to the user, the user may interact with the corresponding contextual controller user interface elements by, for example, clicking on or otherwise selecting a "Skip" button, swiping to another episode ("Swipe to Skip" instruction element), etc. After the user interacts with one or more elements of the contextual controller user interface, the secondary device transmits an indication of the interaction(s) to the playback device. The playback device, in turn, transmits a signal (or set of signals) corresponding to the indication of the interactions to the media content provider, such as a KEYCODE_SELECT key event signal, a series of signals corresponding to directional-pad inputs and a "select" entry to mimic a human interacting with the corresponding contextual display user interface element, etc. The media content provider can then respond to the signal, thereby allowing a user to interact with a media data stream and its contextual user interface elements via their secondary device.

In some examples, the media playback system provides a contextual controller interface to multiple users who are consuming the same media stream, such as presenting contextual controller user interface elements to three users watching a particular episode of a television program together. Each user may interact with the contextual controller user interface elements differently and/or have different pre-stored defaults. For example, if the users are watching a program for which two of the users have previously elected to skip introductions while the other has not yet made a selection, the media playback system can present a contextual controller user interface element to that user while presenting the introduction and presenting a message to the other users indicating that the media playback system is waiting for input from another user. As another example, the media playback system can identify one of the users as a "primary" or "controlling" user and allow that user's defaults and selections to override the defaults and selections of other users. As another example, the media playback system can employ a majority or plurality rule when determining how to aggregate user defaults and/or selections related to contextual controller user interface elements.

In some examples, the media playback system provides a contextual controller user interface that includes additional user interface elements beyond those included as part of the underlying contextual display user interface. For example, if the contextual display user interface includes a user interface element allowing a user to turn on closed captioning, the media playback system can not only present a corresponding contextual controller user interface element, but also user interface elements that also allow the user to adjust the volume, select a language, and so on. As another example, when presenting a contextual controller user interface element corresponding to an underlying text entry display user interface element, the media playback system can present suggested text to fill the corresponding boxes, such as the user's name, email address, etc. or autofill the boxes on the user's behalf.

Figure 11A:
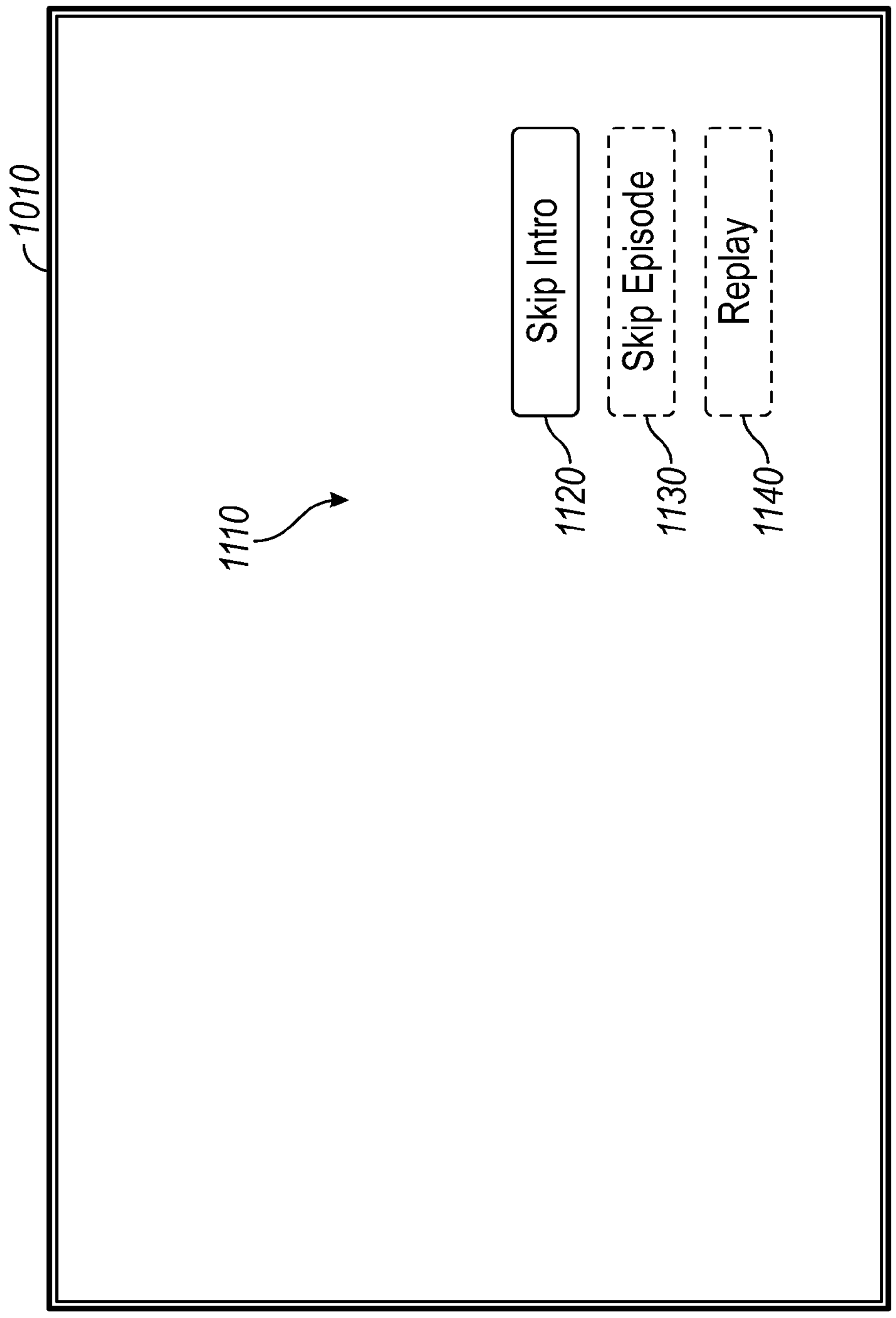
FIGS. 11A-11B are display diagrams illustrating a contextual display user interface and a contextual controller user interface in accordance with some examples of the disclosed technology.

FIG. 11A is a display diagram illustrating a contextual display user interface and corresponding user interface elements in accordance with some examples of the disclosed technology. In this example, a contextual display user interface 1110 is being displayed via video playback device 1010 during display of an episode of a television program. The contextual display user interface 1110 includes contextual display user interface elements 1120, 1130, and/or 1140 comprising "Skip Intro" button 1120, "Skip Episode" button 1130, and "Replay" button 1140. "Skip Intro" button 1120 allows a user to skip a portion of the content, such as a title sequence, opening credits, a previous season or previous episode recap segment, closing credits, etc. portions of the television program. "Skip Episode" button 1130 allows a user to skip the currently playing episode of the television program and advance to a subsequent episode, such as the next episode in the current season of the television program, the next episode of a television program on a list of episodes (e.g., a list defined by the user, a curated list from a third-party, etc.), and so on. "Replay" button 1140 allows the user to replay a previous episode of the television program, such as the previous episode in the current season of the television program, the previous episode of a television program on a list of episodes (e.g., a list defined by the user, a curated list from a third-party, etc.), the previous television program episode played by the video playback device 1010, and so on.

Figure 11B:
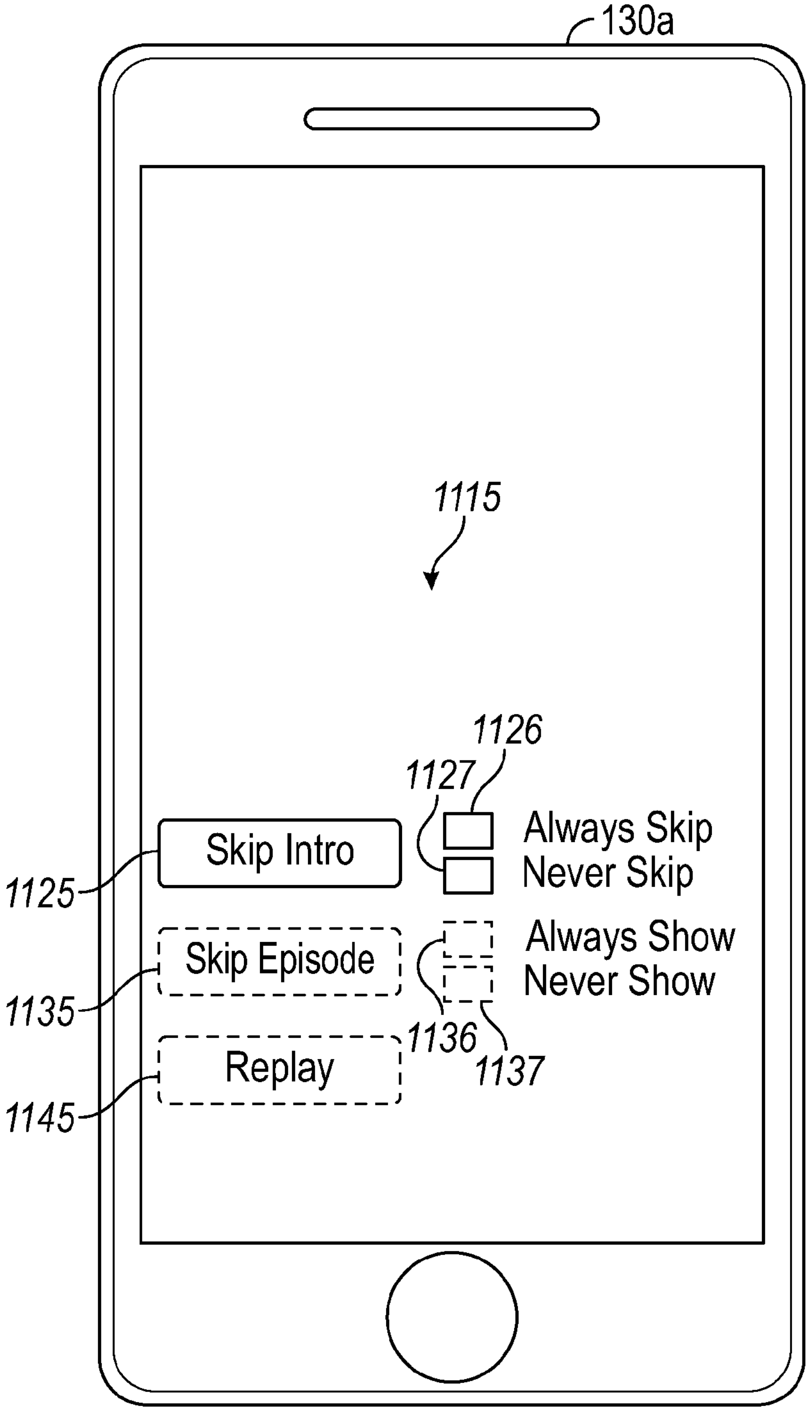

FIG. 11B is a display diagram illustrating a contextual controller user interface 1115 and corresponding controller user interface elements in accordance with some examples of the disclosed technology. In this example, contextual controller user interface 1115 corresponds to contextual display user interface 1110 and is being displayed via control device 130*a* during content playback by playback device 1010. User interface 1150 is a contextual controller user interface generated in response to the detection of display user interface elements represented in FIG. 11A and that includes controller user interface elements 1125, 1135, and 1145 comprising "Skip Intro" button 1125 (corresponding to "Skip Intro" button 1120), "Skip Episode" button 1135 (corresponding to "Skip Episode" button 1130), "Replay" button 1145 (corresponding to "Replay" button 1140), "Always Skip" checkbox element 1126, "Never Skip" checkbox element 1127, "Always Show" checkbox element 1136, and "Never Show" checkbox element 1137. When a user interacts with these user interface elements, the secondary device sends an indication of this interaction to the playback device which, in turn, can send an indication of the interaction(s) to the content provider. In some cases, the secondary device may communicate directly with the content provider.

In the illustrated example of FIG. 11B, the contextual controller user interface 1150 includes all of the user interface elements 1125, 1135, and 1145. In other examples, fewer user interface elements may be displayed according to what is presented to a viewer via the contextual display user interface 1110. For instance, in some examples, the "Skip Intro" button 1125 may be temporarily displayed during a predetermined amount of time (e.g., 15 seconds) at the beginning of a program, without a display of either of the user interface elements 1135 or 1145. In certain examples, both the "Skip Intro" button 1125 and the "Skip Episode" button 1135 may be displayed simultaneously for the same amount of time or for different amounts of time. For instance, the "Skip Intro" button 1125 may be displayed for a shorter amount of time than the "Skip Episode" 1135 button or vice versa. In at least this way, the disclosed technology is expected to enable richer experiences than conventional approaches by presenting the viewer a minimal user interface that presents only the user interface elements that are relevant to what is being displayed at any given moment Doing so can reduce visual clutter and confusion and emphasize only the particular commands available to the viewer at that particular moment.

Figure 12:
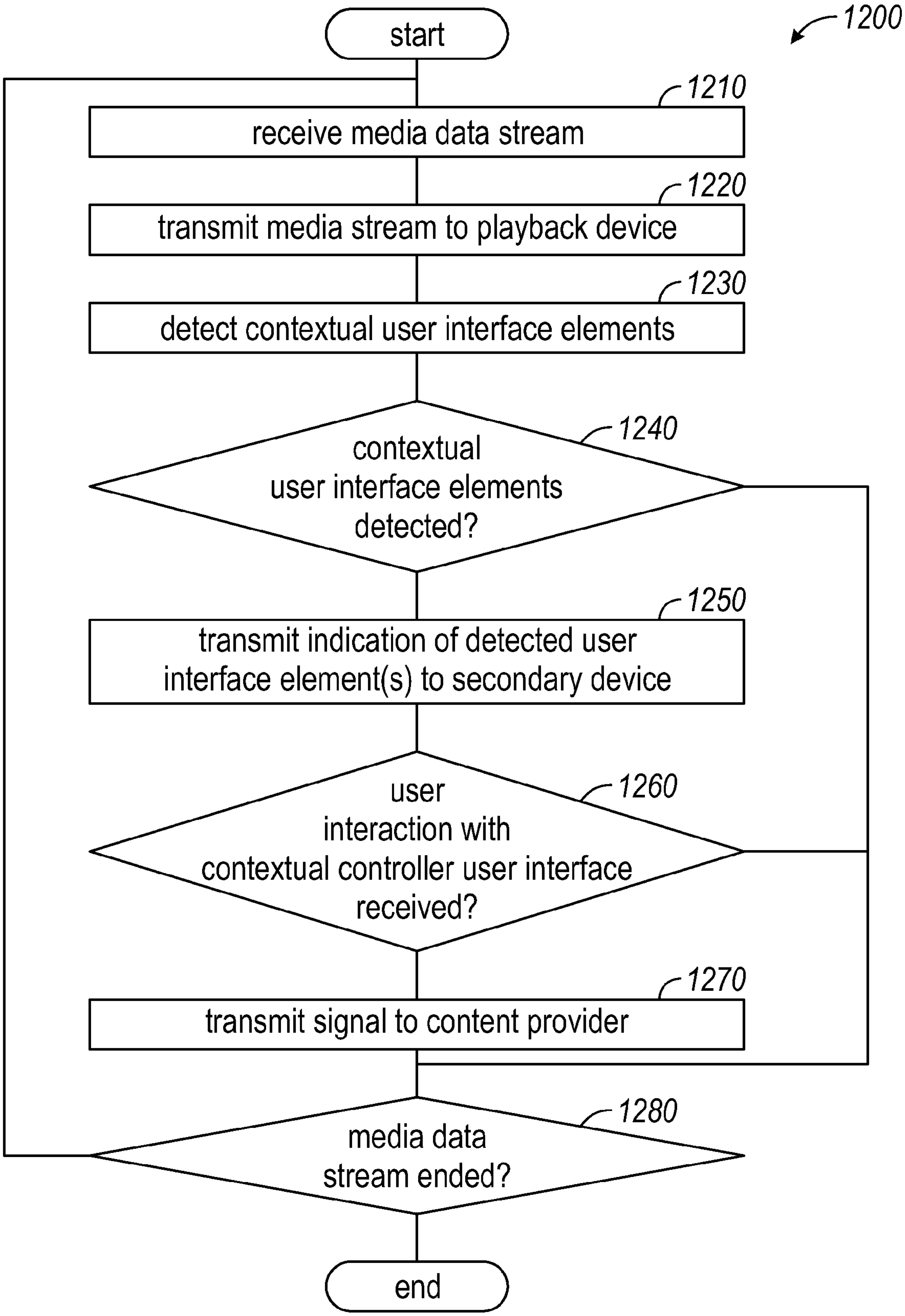
FIG. 12 illustrates a method for providing a contextual controller user interface to one or more secondary devices in accordance with some examples of the disclosed technology.

FIG. 12 illustrates an example method 1200 in accordance with the present technology. The method 1200 can be implemented by any of the devices described herein, or any other devices now known or later developed. Various embodiments of the method 1200 includes one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 1200 and for other processes and methods disclosed herein, the flowchart shows functionality and operation of possible implementations of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIG. 12 may represent circuitry that is wired to perform the specific logical functions in the process.

The method 1200 begins at block 1210, which involves the media playback system receiving a media data stream from a media content provider, such as video content. At block 1220, the media playback system transmits the received media data stream to a playback device, such as a smart television. In block 1230, the media playback system detects whether there are any contextual user interface elements depicted in the media data stream. In some cases, to conserve resources, the media playback system only detects whether there are user interface elements in the media data stream during predetermined portions of playback, such as the first two minutes of an episode of a television program, the last five minutes of a movie, in response to the media playback system receiving an indication that a commercial is about to be presented, and so on.

In decision block 1240, if the media playback system determines that there are one or more contextual user interface elements in the received media data stream, then the media playback system continues at block 1250, otherwise the media playback system continues at block 1280. The media playback system may determine that there are one or more contextual user interface elements in the received media data stream using any number of techniques including, for example, inspecting user interface elements via an accessibility service, inferring user interface elements from user history, service application communication, pixel sniffing, and so on. In some cases, the content provider broadcasts a message when a new user interface element is to be displayed, is to be removed, etc. The media playback system can use these messages to determine or anticipate when contextual controller user interface elements are to be displayed (or removed). In block 1250, the media playback system transmits or pushes an indication of the contextual user interface element(s) to a secondary device, thereby causing the secondary device to present a contextual controller user interface element(s) corresponding to the contextual user interface elements in the received media stream for a period of time (e.g., two seconds, 15 seconds, 30 seconds, one minute), and may include a countdown timer to notify the user that the presentation is temporary. The media playback system may pause playback of content to give the user additional time to interact with contextual controller user interface elements. In the event that the media playback system receives an indication that the user has interacted with a hardware remote, virtual remote, user interface, etc. without making a selection, the media playback system can extend or suspend the countdown timer to give the user additional time to interact with the contextual controller user interface element. Additionally, the user may manually dismiss the presentation of a contextual controller user interface element by selecting a "Dismiss Button," pressing a "back" button on a hardware remote, etc. In some cases, the media playback system causes options to be presented in conjunction with the controller user interface elements, such as an option for the media playback system to automatically interact with future contextual controller user interface element(s) on behalf of a user (e.g., "Always Skip Intro(s)," "Skip All Intros," "Always Prompt for Closed Captioning," etc.), an option to disable automatic interactions, an option to never present a particular contextual controller user interface element (e.g., "Never Skip Intro" or "Always Watch Recap(s)," etc.), and so on. The media playback system stores and maintains these selections in a user profile store. Thus, the media playback system can present and interact with the contextual controller user interface in accordance with user preferences and update these preferences in response to user interactions without presenting contextual controller user interface elements. In this manner, the media playback system can automatically configure content playback in accordance with a user's preferences. In some cases, the media playback system allows a user to toggle auto-skipping of one or more types of sections (e.g., intros, recaps, skippable advertising, etc.) so that the media playback system can automatically interact with these contextual user interface elements on behalf of the user, thereby enhancing the user's experience as compared to conventional approaches.

In decision block 1260, if the media playback system determines that one or more indications of user interactions with the contextual controller user interface have been received, then the media playback system continues at block 1270, otherwise the media playback system continues at block 1280. In block 1270, the media playback system transmits one or more signals corresponding to the received one or more indications to the content provider, such as a signal indicating selection of a particular user interface element, a signal corresponding to a string of characters to be input into a text field, one or more signal corresponding menu navigation interactions, and so on. In decision block 1280, if the media data stream has concluded, then method 1200 completes, otherwise the media playback system loops back to block 1210 to continue receiving the media data stream.

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example embodiment or implementation of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1: A media playback system comprising: one or more processors; data storage having instructions thereon that, when executed by the one or more processors, cause the media playback system to perform operations comprising: receiving, at a computing device, a media data stream from a media content provider; transmitting the media data stream from the computing device to a display device for playback; determining that the media data stream comprises a contextual display user interface element; after the determination, causing a controller device to present a contextual controller user interface element corresponding to the contextual display user interface element; receiving, at the computing device, an indication of user input via the contextual controller user interface element; and after receiving the indication, transmitting, via the computing device, a signal corresponding to the received indication of user input to the media content provider.

Example 2: The media playback system of any one of the preceding Examples, wherein the contextual display user interface element comprises a selectable button, and wherein transmitting the signal corresponding to the received indication of user input to the media content provider comprises selecting the button.

Example 3: The media playback system of any one of the preceding Examples, wherein the contextual display user interface element is a first contextual display user interface element, wherein the contextual controller user interface element is a first contextual controller user interface element, the operations further comprising: at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

Example 4: The media playback system of any one of the preceding Examples, wherein determining that the media data stream comprises the contextual display user interface element comprises utilizing an accessibility service to identify the contextual display user interface element.

Example 5: The media playback system of any one of the preceding Examples, wherein determining that the media data stream comprises the contextual display user interface element comprises inferring a skip option based at least in part on a timestamp of video data being played back.

Example 6: The media playback system of any one of the preceding Examples, wherein determining that the media data stream comprises the contextual display user interface element comprises analyzing pixels displayed via the display device to identify the contextual display user interface element.

Example 7: The media playback system of any one of the preceding Examples, wherein the controller device comprises a touch-sensitive display, and wherein the contextual controller user interface element comprises a selectable button displayed via the touch-sensitive display.

Example 8: The media playback system of any one of the preceding Examples, further comprising, after determining that the media data stream comprises the contextual display user interface element, determining, from among a set of one or more user interface elements associated with the media content provider, a user interface element associated with the media content provider corresponding to the contextual display user interface element.

Example 9: The media playback system of any one of the preceding Examples, wherein causing the controller device to present the contextual controller user interface element corresponding to the contextual display user interface element comprises causing the controller device to present a controller user interface that comprises a subset of one or more user interface elements associated with the media content provider, wherein the subset of one or more user interface elements comprises the contextual controller user interface element.

Example 10: The media playback system of any one of the preceding Examples, wherein causing the controller device to present the contextual controller user interface element comprises suppressing display of user interface elements associated with the media content provider unrelated to the contextual controller user interface element.

Example 11: A method performed by a media playback system, the method comprising: receiving, at a computing device, a media data stream from a media content provider; transmitting the media data stream from the computing device to a display device for playback; determining that the media data stream comprises a contextual display user interface element; after the determination, causing a controller device to present a contextual controller user interface element corresponding to the contextual display user interface element; receiving, at the computing device, an indication of a user input via the contextual controller user interface element; and after receiving the indication, transmitting, via the computing device, a signal corresponding to the received indication of user input to the media content provider.

Example 12: The method of any one of the preceding Examples, wherein the contextual display user interface element comprises a selectable button, and wherein transmitting the signal corresponding to the received indication of user input to the media content provider comprises selecting the button.

Example 13: The method of any one of the preceding Examples, wherein the contextual display user interface element is a first contextual display user interface element, wherein the contextual controller user interface element is a first contextual controller user interface element, the method further comprising: at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

Example 14: The method of any one of the preceding Examples, wherein determining that the media data stream comprises the contextual display user interface element comprises utilizing an accessibility service to identify the contextual display user interface element.

Example 15: The method of any one of the preceding Examples, wherein determining that the media data stream comprises the contextual display user interface element comprises inferring a skip option based at least in part on a timestamp of video data being played back.

Example 16: The method of any one of the preceding Examples, wherein determining that the media data stream comprises the contextual display user interface element comprises analyzing pixels displayed via the display device to identify the contextual display user interface element.

Example 17: The method of any one of the preceding Examples, wherein the controller device comprises a touch-sensitive display, and wherein the contextual controller user interface element comprises a selectable button displayed via the touch-sensitive display.

Example 18: The method of any one of the preceding Examples, further comprising, after determining that the media data stream comprises the contextual display user interface element, determining, in a set of one or more user interface elements associated with the media content provider, a user interface element associated with the media content provider corresponding to the contextual display user interface element.

Example 19: The method of any one of the preceding Examples, wherein causing the controller device to present the contextual controller user interface element corresponding to the contextual display user interface element, comprises causing the controller device to present a contextual controller user interface that comprises a subset of one or more user interface elements associated with the media content provider, wherein the subset of one or more user interface elements comprises the contextual controller user interface element.

Example 20: The method of any one of the preceding Examples, wherein causing the controller device to present the contextual controller user interface element comprises suppressing display of user interface elements associated with the media content provider unrelated to the contextual controller user interface element.

Example 21: One or more tangible, non-transitory computer-readable media storing instructions that, when executed by one or more processors of a media playback system, cause the media playback system to perform operations comprising: receiving, at a computing device, a media data stream from a media content provider; transmitting the media data stream from the computing device to a display device for playback; determining that the media data stream comprises a contextual display user interface element; after the determination, causing a controller device to present a contextual controller user interface element corresponding to the contextual display user interface element; receiving, at the computing device, an indication of a user input via the contextual controller user interface element; and after receiving the indication, transmitting, via the computing device, a signal corresponding to the received indication of user input to the media content provider.

Example 22: The one or more tangible, non-transitory computer-readable media of any one of the preceding Examples, wherein the contextual display user interface element comprises a selectable button, and wherein transmitting the signal corresponding to the received indication of user input to the media content provider comprises selecting the button.

Example 23: The one or more tangible, non-transitory computer-readable media of any one of the preceding Examples, wherein the contextual display user interface element is a first contextual display user interface element, wherein the contextual controller user interface element is a first contextual controller user interface element, the operations further comprising: at a time transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

Example 24: The one or more tangible, non-transitory computer-readable media of any one of the preceding Examples, wherein determining that the media data stream comprises the contextual display user interface element comprises utilizing an accessibility service to identify the contextual display user interface element.

Example 25: The one or more tangible, non-transitory computer-readable media of any one of the preceding Examples, wherein determining that the media data stream comprises the contextual display user interface element comprises inferring a skip option based at least in part on a timestamp of video data being played back.

Example 26: The one or more tangible, non-transitory computer-readable media of any one of the preceding Examples, wherein determining that the media data stream comprises the contextual display user interface element comprises analyzing pixels displayed via the display device to identify the contextual display user interface element.

Example 27: The one or more tangible, non-transitory computer-readable media of any one of the preceding Examples, wherein the controller device comprises a touch-sensitive display, and wherein the contextual controller user interface element comprises a selectable button displayed via the touch-sensitive display.

Example 28: The one or more tangible, non-transitory computer-readable media of any one of the preceding Examples, further comprising, after determining that the media data stream comprises the contextual display user interface element, determining, in a set of one or more user interface elements associated with the media content provider, a user interface element associated with the media content provider corresponding to the contextual display user interface element.

Example 29: The one or more tangible, non-transitory computer-readable media of any one of the preceding Examples, wherein causing the controller device to present the contextual controller user interface element corresponding to the contextual display user interface element, comprises causing the controller device to present a controller user interface that comprises a subset of one or more user interface elements associated with the media content provider, wherein the subset of one or more user interface elements comprises the contextual controller user interface element.

Example 30: The one or more tangible, non-transitory computer-readable media of any one of the preceding Examples, wherein causing the controller device to present the controller user interface comprises suppressing display of user interface elements associated with the media content provider unrelated to the contextual controller user interface element.

The invention claimed is:

1. A media playback system comprising:

one or more processors;

data storage having instructions thereon that, when executed by the one or more processors, cause the media playback system to perform operations comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises analyzing pixels displayed via the display device to identify the contextual display user interface element;

after the determination, causing a controller device to present a contextual controller user interface element corresponding to the contextual display user interface element;

receiving, at the computing device, an indication of user input via the contextual controller user interface element; and after receiving the indication, transmitting, via the computing device, a signal corresponding to the received indication of user input to the media content provider.

2. The media playback system of claim 1, wherein the contextual display user interface element comprises a selectable button, and wherein transmitting the signal corresponding to the received indication of user input to the media content provider comprises selecting the button.

3. The media playback system of claim 1, wherein the contextual display user interface element is a first contextual display user interface element, wherein the contextual controller user interface element is a first contextual controller user interface element, the operations further comprising:

at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

4. A media playback system comprising:

one or more processors;

data storage having instructions thereon that, when executed by the one or more processors, cause the media playback system to perform operations comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises utilizing an accessibility service to identify the contextual display user interface element;

after the determination, causing a controller device to present a contextual controller user interface element corresponding to the contextual display user interface element;

receiving, at the computing device, an indication of user input via the contextual controller user interface element; and after receiving the indication, transmitting, via the computing device, a signal corresponding to the received indication of user input to the media content provider.

5. The media playback system of claim 1, wherein determining that the media data stream comprises the contextual display user interface element further comprises inferring a skip option based at least in part on a timestamp of video data being played back.

6. The media playback system of claim 1, wherein the controller device comprises a touch-sensitive display, and wherein the contextual controller user interface element comprises a selectable button displayed via the touch-sensitive display.

7. The media playback system of claim 1, further comprising, after determining that the media data stream comprises the contextual display user interface element, determining, from among a set of one or more user interface elements associated with the media content provider, a user interface element associated with the media content provider corresponding to the contextual display user interface element.

8. The media playback system of claim 1, wherein causing the controller device to present the contextual controller user interface element corresponding to the contextual display user interface element comprises causing the controller device to present a controller user interface that comprises a subset of one or more user interface elements associated with the media content provider, wherein the subset of one or more user interface elements comprises the contextual controller user interface element.

9. The media playback system of claim 8, wherein causing the controller device to present the contextual controller user interface element comprises suppressing display of user interface elements associated with the media content provider unrelated to the contextual controller user interface element.

10. A method performed by a media playback system, the method comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises utilizing an accessibility service to identify the contextual display user interface element;

after the determination, causing a controller device to present a contextual controller user interface element corresponding to the contextual display user interface element;

receiving, at the computing device, an indication of a user input via the contextual controller user interface element; and after receiving the indication, transmitting, via the computing device, a signal corresponding to the received indication of user input to the media content provider.

11. The method of claim 10, wherein the contextual display user interface element is a first contextual display user interface element, wherein the contextual controller user interface element is a first contextual controller user interface element, the method further comprising:

at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

12. The method of claim 10, wherein determining that the media data stream comprises the contextual display user interface element further comprises inferring a skip option based at least in part on a timestamp of video data being played back.

13. A method performed by a media playback system, the method comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises analyzing pixels displayed via the display device to identify the contextual display user interface element;

after the determination, causing a controller device to present a contextual controller user interface element corresponding to the contextual display user interface element;

receiving, at the computing device, an indication of a user input via the contextual controller user interface element; and after receiving the indication, transmitting, via the computing device, a signal corresponding to the received indication of user input to the media content provider.

14. One or more tangible, non-transitory computer-readable media storing instructions that, when executed by one or more processors of a media playback system, cause the media playback system to perform operations comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises analyzing pixels displayed via the display device to identify the contextual display user interface element;

after the determination, causing a controller device to present a contextual controller user interface element corresponding to the contextual display user interface element;

receiving, at the computing device, an indication of a user input via the contextual controller user interface element; and after receiving the indication, transmitting, via the computing device, a signal corresponding to the received indication of user input to the media content provider.

15. The one or more tangible, non-transitory computer-readable media of claim 14, wherein the contextual display user interface element is a first contextual display user interface element, wherein the contextual controller user interface element is a first contextual controller user interface element, the operations further comprising:

at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

16. One or more tangible, non-transitory computer-readable media storing instructions that, when executed by one or more processors of a media playback system, cause the media playback system to perform operations comprising:

receiving, at a computing device, a media data stream from a media content provider;

transmitting the media data stream from the computing device to a display device for playback;

determining that the media data stream comprises a contextual display user interface element, wherein determining that the media data stream comprises the contextual display user interface element comprises utilizing an accessibility service to identify the contextual display user interface element;

after the determination, causing a controller device to present a contextual controller user interface element corresponding to the contextual display user interface element;

receiving, at the computing device, an indication of a user input via the contextual controller user interface element; and after receiving the indication, transmitting, via the computing device, a signal corresponding to the received indication of user input to the media content provider.

17. The one or more tangible, non-transitory computer-readable media of claim 14, wherein determining that the media data stream comprises the contextual display user interface element further comprises inferring a skip option based at least in part on a timestamp of video data being played back.

18. The media playback system of claim 4, wherein the contextual display user interface element is a first contextual display user interface element, wherein the contextual controller user interface element is a first contextual controller user interface element, the operations further comprising:

at a time after transmitting the signal corresponding to the received indication of user input to the media content provider, determining that the media data stream comprises a second contextual display user interface element; and presenting, via the controller device, a second contextual controller user interface element corresponding to the second contextual display user interface element, wherein the second contextual display user interface element is different from the first contextual display user interface element, and wherein the second contextual controller user interface element is different from the first contextual controller user interface element.

19. The media playback system of claim 4, wherein the controller device comprises a touch-sensitive display, and wherein the contextual controller user interface element comprises a selectable button displayed via the touch-sensitive display.

20. The media playback system of claim 4, further comprising, after determining that the media data stream comprises the contextual display user interface element, determining, from among a set of one or more user interface elements associated with the media content provider, a user interface element associated with the media content provider corresponding to the contextual display user interface element.

* * * * *